United States Patent [19]
Klovstad et al.

[11] Patent Number: 5,603,240
[45] Date of Patent: Feb. 18, 1997

[54] MECHANICAL TRANSMISSION CONTINUOUSLY VARIABLE FROM FORWARD TO REVERSE

[76] Inventors: John W. Klovstad, 140 Reservoir Rd., Whitefish, Mont. 59937; James A. Fortune, 5648 Van Dyke, Almont, Mich. 48003

[21] Appl. No.: 206,651

[22] Filed: Mar. 4, 1994

[51] Int. Cl.$^6$ ............................. F16H 29/20; F16H 29/16
[52] U.S. Cl. .................................. 74/120; 74/121; 74/125
[58] Field of Search ............................. 74/120, 121, 124, 74/125, 125.5, 130, 131

[56] References Cited

U.S. PATENT DOCUMENTS

| | | | |
|---|---|---|---|
| 1,050,226 | 1/1913 | Nixon | 74/120 X |
| 1,187,848 | 6/1916 | Landis | 74/121 X |
| 1,938,785 | 12/1933 | Sassen | 74/121 |
| 3,327,544 | 6/1967 | Colinet | 74/125 |

FOREIGN PATENT DOCUMENTS

| | | | |
|---|---|---|---|
| 996723 | 9/1951 | France | 74/121 |

*Primary Examiner*—Allan D. Herrmann

[57] ABSTRACT

The transmission couples a cam shaft to an output shaft through a plurality of sets of specialized linkages. Each set of specialized linkages comprises: a displacement waveform generator (DWG) comprising a solid cam rigidly attached to the cam shaft, the outer surface of which produces a periodic displacement that is linearly proportional to rotation angle of the cam shaft over a substantial part of a rotation cycle; an input linear displacement multiplier (ILDM) comprising a link surrounding the cam shaft such that when the cam shaft rotates the link oscillates back and forth with a displacement that is linearly proportional to rotation angle of the cam shaft over a substantial part of a rotation cycle; an output linear displacement multiplier (OLDM) comprising a link pivotally connected to the ILDM through a power coupler, able to slide back and forth, and having a longitudinally extending rack of gear teeth; a disk free to rotate coaxially with the output shaft that has a concentric pinion gear continuously engaging the rack of teeth along the OLDM such that the disk is rotationally oscillated as the OLDM moves back and forth; and one or more calipers that may lock the disk to a flange that is affixed to the transmission's output shaft. Disks are locked to flanges at such times that the output shaft is rotated in a uniform manner. The apparent gear ratio is continuously varied from full forward, to neutral, to reverse by changing the angle between the ILDM and OLDM.

15 Claims, 24 Drawing Sheets

Fig. 8 (a)
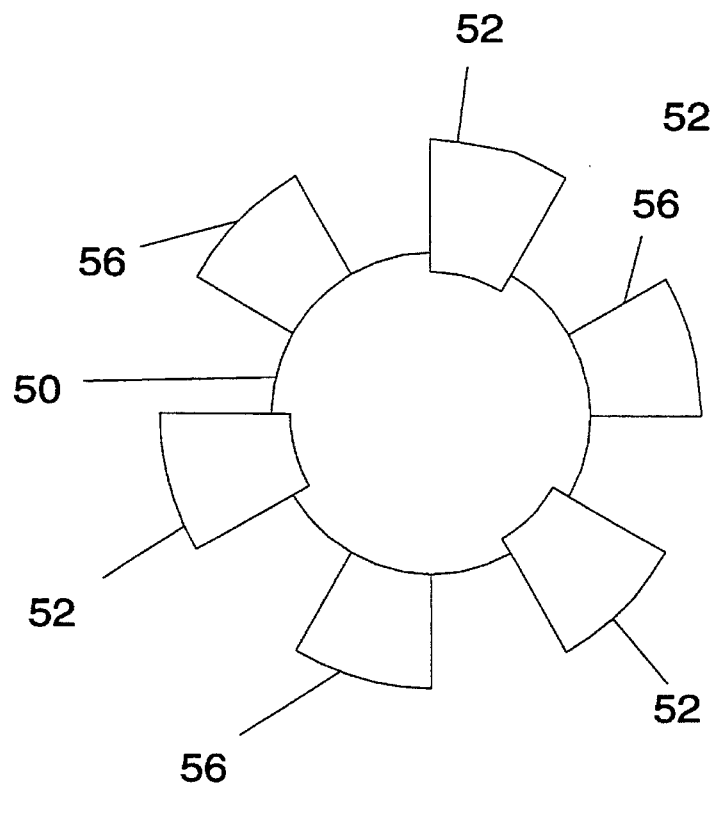
Fig. 8 (c)
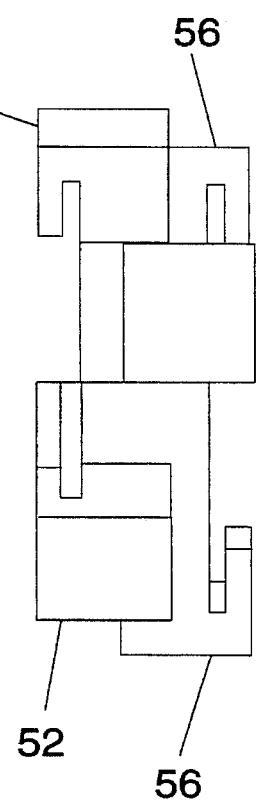
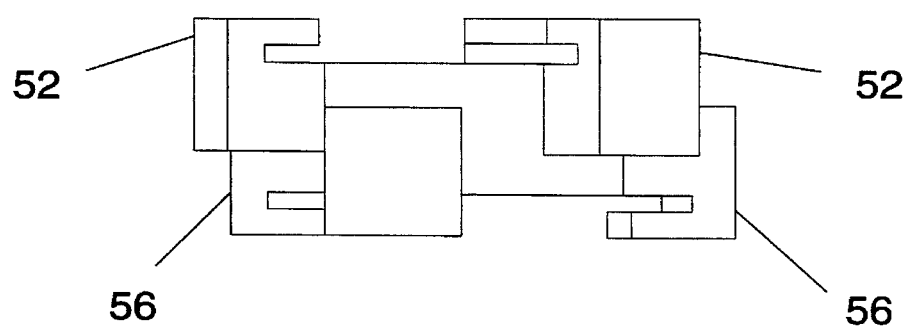
Fig. 8 (b)

MECHANICAL TRANSMISSION CONTINUOUSLY VARIABLE FROM FORWARD TO REVERSE

TECHNICAL FIELD OF THE INVENTION

The technical field of the present invention is that of a transmission capable of receiving power into its input in the form of a rotational torque and velocity, and exporting power from its output in the form of a rotational torque and velocity capable of being different than that received. More particularly, the technical field of the present invention encompasses transmissions capable of continuously varying the exported rotational velocity between a maximum value in a clockwise direction to a maximum value in a counterclockwise direction. Even more particularly, the technical field of the present invention encompasses mechanical transmissions that convert rotary motion into oscillatory linear motion and then selectively convert such motion back into rotary motion. Most particularly, the technical field of the present invention includes continuously variable transmissions having low vibration, The technical field of the present invention does not encompass continuously variable transmissions using belts and pulleys, v-belts, or hydraulic pumps.

BACKGROUND INFORMATION

A continuously variable transmission having low vibration has long been sought.

An object of the present invention is to produce a transmission continuously variable from forward to reverse, that has a high degree of internal balance so as inherently to have low vibration.

SUMMARY OF THE INVENTION

The foregoing and other objects and advantages are achieved with the apparatus disclosed below.

The transmission, in its preferred embodiment, couples (by means such as gears) the output shaft of a prime mover (such as an engine or motor) to a cam shaft that is, in turn, coupled to the transmission's output shaft through a plurality of sets of specialized linkages. Each set of specialized linkages comprises (in the preferred embodiment): (1) a displacement waveform generator (DWG) comprising a solid cam rigidly attached to the cam shaft, the outer surface of which produces a periodic displacement that is linearly proportional to rotation angle of the cam shaft over a substantial part of a rotation cycle; (2) an input linear displacement multiplier (ILDM) comprising a link containing (in line from one end to the other end) a pull cam follower, an extended longitudinal orifice, a push cam-follower, and a power coupler where the link is orthogonal to the cam shaft, the longitudinal orifice surrounds the cam shaft, and the DWG's cam is held between the two cam followers such that when the cam shaft rotates the link oscillates back and forth with a displacement that is linearly proportional to rotation angle of the cam shaft over a substantial part of a rotation cycle; (3) an output linear displacement multiplier (OLDM) comprising a link having an extended axial orifice, a rack of gear teeth extending longitudinally, and means of support that allow low friction movement back and forth where the axial orifice receives the power coupler of the ILDM and the OLDM is orthogonal to the transmission's output shaft; (4) a disk free to rotate coaxially with the output shaft that has a concentric pinion gear continuously engaging the rack of teeth along the OLDM such that the disk is rotationally oscillated as the OLDM moves back and forth; and (5) one or more calipers that are capable of locking (when commanded to do so) the disk to a flange that is affixed to the transmission's output shaft.

In the preferred embodiment, disks are locked to flanges when they have the same rotational velocities. A disk and a flange are locked together and unlocked from each other at moments when their velocities are equal resulting in little wear. In the preferred embodiment, three calipers on the flange are used to engage a disk and the calipers are actuated electrically through slip rings on the output shaft. While not expedient in the preferred embodiment, it is desirable to adapt the use of electrorheological fluids in lieu of the calipers because of their simple actuation and fast response time.

The mounting of the parts is such that the cam shaft (and captive ILDMs) may be rotated with respect to the transmission's output shaft, disks, and OLDMs. The relative rotation effects a change in the transmission's effective mechanical advantage (apparent gear ratio). The power coupler of the ILDM and the extended axial orifice of the OLDM allows the relative rotation while transferring a scaled amount of the ILDM's displacement to be transferred to the OLDM. The scaling factor varies as the cosine of the angle ($\phi$) with full transfer when the ILDM and OLDM are collinear ($\phi=0$), to no transfer (neutral) when the ILDM and OLDM are at right angles to each other ($\phi=90°$), to a negative transfer (reverse) when the angle goes past ninety degrees.

in the preferred embodiment there are four sets of linkages, grouped in pairs, with the cams of each pair permanently rotated 180 degrees apart and with each pair's cams rotated 90 degrees apart. This relative phasing of the four cams results in at least one linkage transferring power to the output shaft at all times. In the preferred embodiment there are only two flanges with a disk from a pair placed on each side of a flange. The result of the arrangement used in the preferred embodiment is that at least one disk is always locked to a flange, for short periods of time one disk from each pair is locked to both flanges, disks are counter-rotating, linkages are moving in opposite directions, and thus momentums tend to cancel and a number of vibrational modes are essentially cancelled. The inherent smoothness of operation is a desirable feature of the preferred embodiment's use of four cams.

Clearly, a number of conventional bearings are also needed at the natural places to allow the transmission to work. While not expedient in the preferred embodiment, it is desirable to use hydraulic bearings with the parts that move back-and-forth (such as the ILDM, OLDM, and as a substitute for the power coupler bearing) to reduce the frictional losses further.

The process for designing of a cam having a surface that produces a periodic displacement that is linearly proportional to rotation angle of the cam shaft over a substantial part of a rotation cycle has been developed. A very large number of possible shapes satisfy the requirement. The appendix discloses a process for designing such cams in the form of a computer program written in BASIC. The appendix also shows a worked-out example. An alternative way of describing the cams is that each must have a surface such that the distance from the center of the cam shaft to the center of a cam follower is directly proportional to the rotation angle of the cam over a significant portion of a cycle of rotation of the cam shaft. Thus, over a substantial portion of a cycle of rotation of the cam shaft, a rotation of any ε degrees will produce the same δ millimeters of displacement. Obviously, there are two such linearly or directly proportional intervals per cycle and the δ millimeters of displacement will be to the left during one interval and to the right during the other interval.

The invention comprehends means that are different from those of the preferred embodiment for effecting: (1) a displacement waveform generator (DWG) that produces oscillatory linear motion from rotational motion such that the linear motion is linearly (directly) proportional to rotation angle over a substantial portion of a cycle; (2) a linear displacement multiplier (LDM) that scales linear displacement; and (3) a combiner to convert oscillatory linear motion to uniform rotational motion. Some alternatives follow.

A variety of cam and cam follower arrangements could be used to effect a DWG. DWGs could include rolling (as used in the preferred embodiment) or sliding cam followers and even cam followers that follow the interior surface of a cam. The linear displacements produced by a DWG need not be perpendicular to the axis of the cam shaft.

An LDM could be implemented by a teeter-totter device (such as a lever with an adjustable fulcrum) to replicate a linear displacement at one end into a scaled linear displacement at the other end. A teeter-totter device where the output point may vary along the length could implement an LDM where the sign of the scaling multiple could change.

An equivalent of the rack and pinion gear of the preferred embodiment could be implemented by using a cylinder with a plurality of inelastic, flexible straps attached at one end to the cylinder and wrapped around the cylinder such that the cylinder rolls on an oscillating flat surface (to which the other ends of the straps are attached). If two straps are used, they would be wound in opposite directions so that the rolling cylinder will wrap up one strap while unwrapping the other strap. If more than two straps are used, at least one of them must be wound in a contrary direction. Reciprocating motion of the flat surface will produce an oscillating motion of the cylinder that can have the advantage of virtually no backlash.

A bi-directional clutch such as the presently available calipers (used by the preferred embodiment intermittently to couple a disk to the output shaft) are designed for use with disk brakes where slippage and attendant conversion (and dissipation) of large amounts of kinetic energy is expected. In the present invention, no relative motion of the calipers and disk is expected near the time of engagement or disengagement and there should be no relative motion while the calipers are engaged. Thus the dissipation requirements are negligible and especially tailored calipers could be used. It would be particularly appropriate for a relatively low speed and high torque transmission to use a specialized gripping means that so fixes the engagement that slippage would cause the shearing of a part. For rapidly reciprocating disks the use of gripping means using electrically controlled electrorheological or magnetorheological fluids between disks (or their equivalents) and flanges (or their equivalents) would be advantageous because of the rapid response times of such fluids (on the order of 1 millisecond). These fluids become extremely viscous, approaching a solid, upon the application of an electric or magnetic field. *Scientific American* for October 1993 has a discussion of electrorheological fluids on pages 58 to 64 and a discussion of magnetorheological fluids on pages 112 to 113. While the use of gripping means that establish a non-slipping coupling has obvious advantages (including the ability to send energy back towards the input of the transmission, perhaps to a storage device such as a flywheel) the gripping means could use overriding (or one way) clutches. Overriding clutches could be used, but their use is not preferred.

The above discussed substitutes for the respective parts of the preferred embodiment are illustrative of substitutes and others would be apparent to one skilled in the art and implementable without undue experimentation. The elements and connections of the preferred embodiment are believed by the inventors to be the best implementation of the present invention in view of a desire for a relatively simple construction using few specialized parts.

BRIEF DESCRIPTION OF THE DRAWINGS

FIGS. 8 a)–c) present orthogonal views of a flange and calipers in accordance with the present invention.

Note that if an item is marked with a number beginning with an X, reference is being made to a generic item where X could be 1, 2, 3, or 4. Thus X27 refers to a cam, X00 refers to an ILDM, X40 refers to an OLDM, X70 refers to a disk, and X80 to a pinion. Note also that conventional bearings are shown in conjunction to parts that move but are not necessarily marked with a number.

DETAILED DESCRIPTION OF THE INVENTION AND ITS PREFERRED EMBODIMENT

Figure 2:
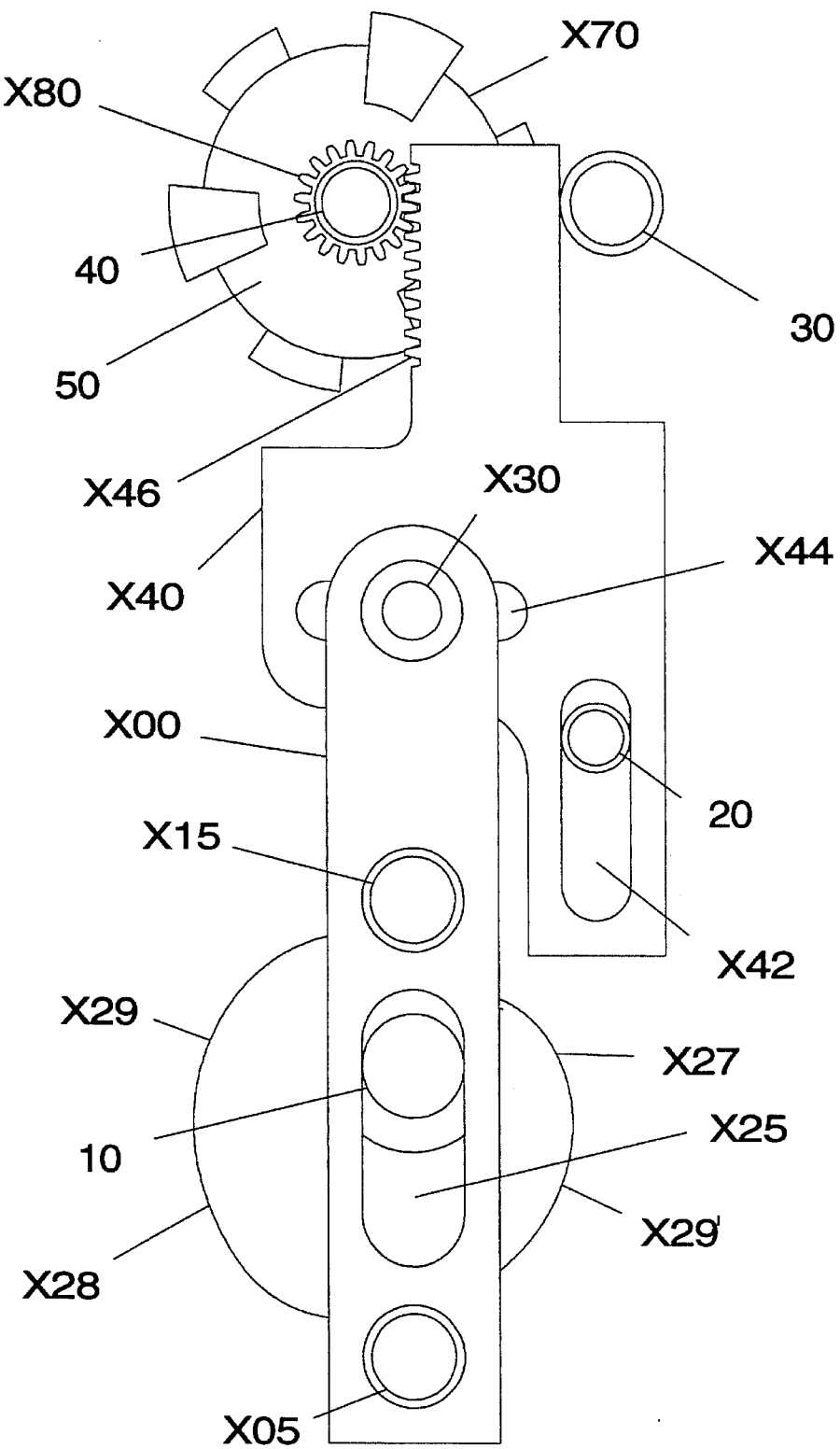
FIG. 2 is a side view of one specialized linkage showing the juxtaposition of the major parts FIGS. 3a)–b) present orthogonal views of the cam in accordance with the present invention.
Figure 3:
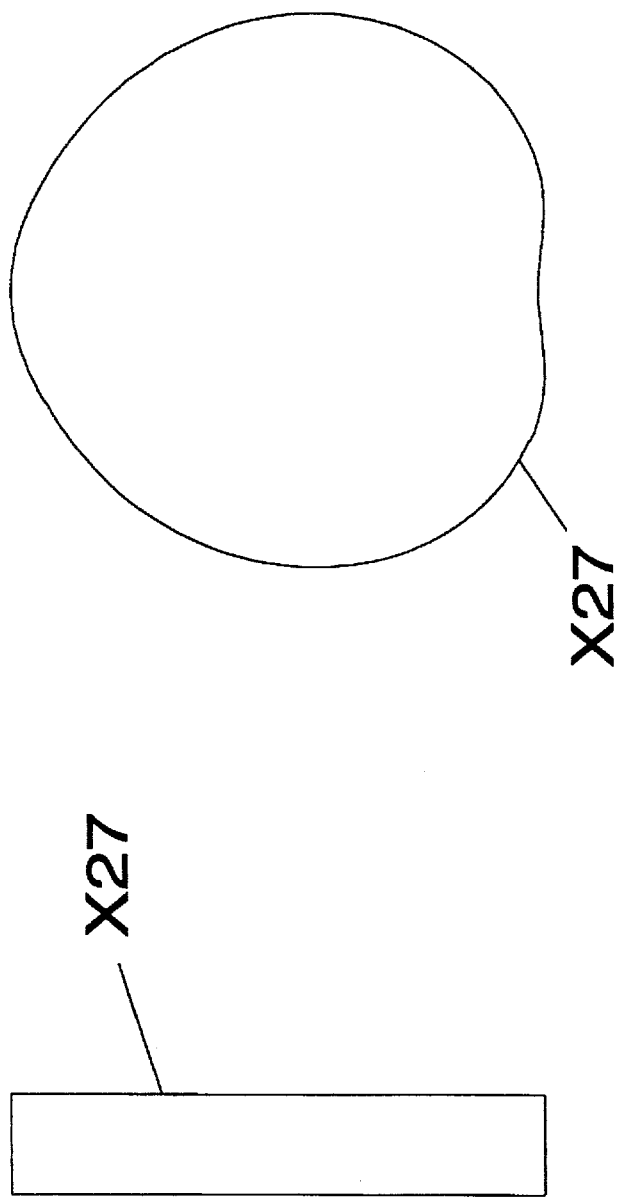
Figure 4:
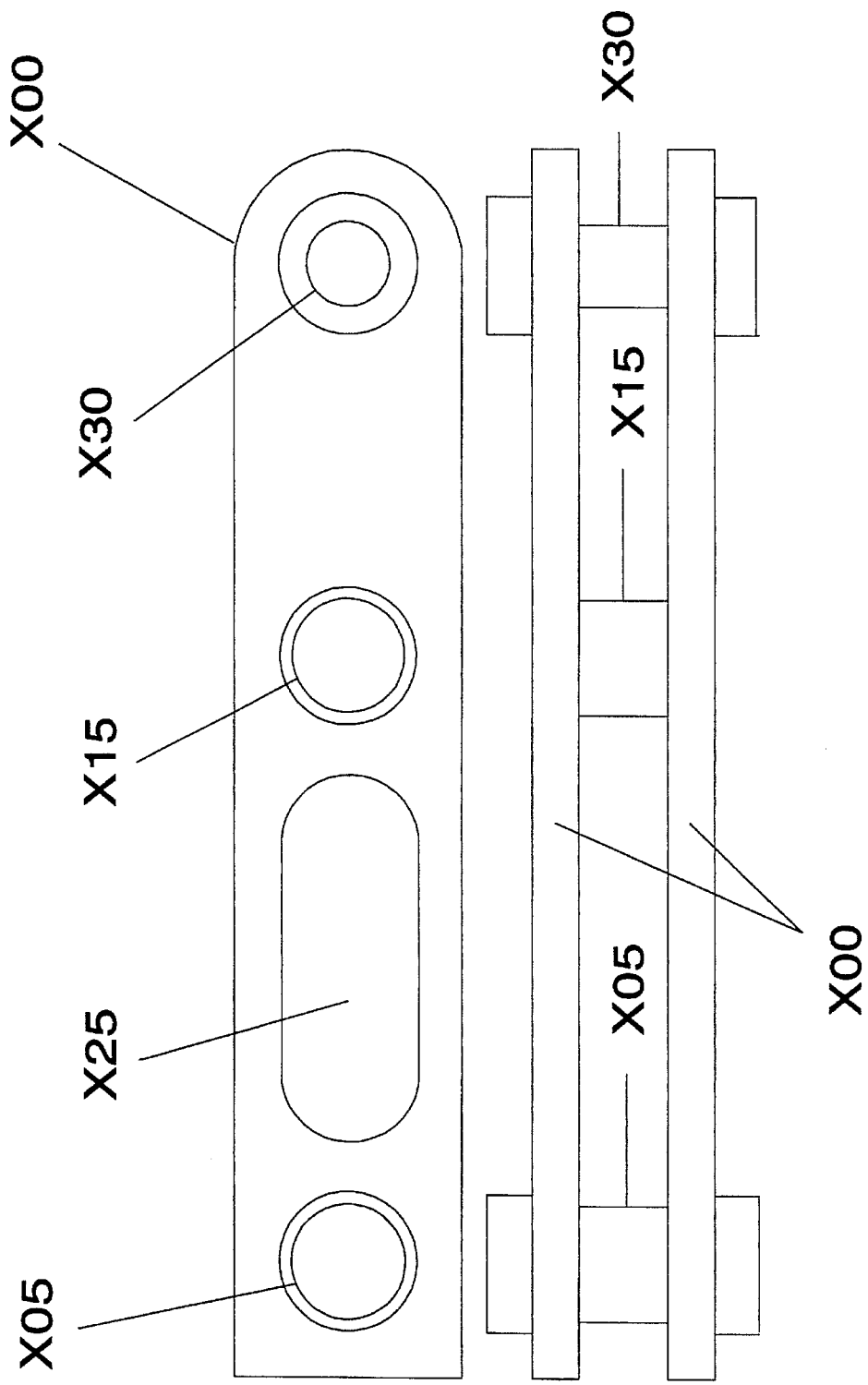
FIGS. 4 a) & b) present orthogonal views of an ILDM in accordance with the present invention.
Figure 5:
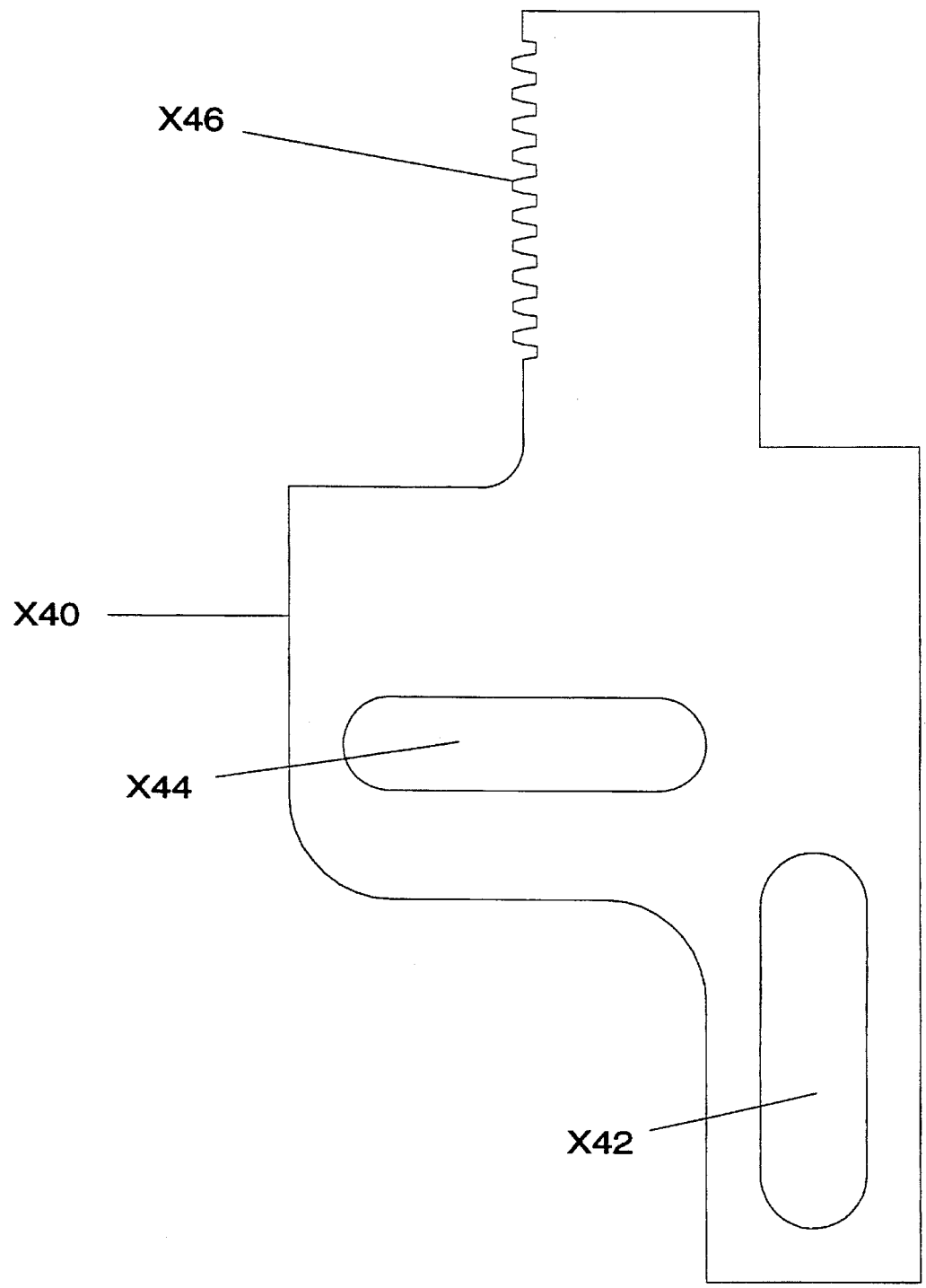
FIG. 5 is a side view of an OLDM
Figure 6:
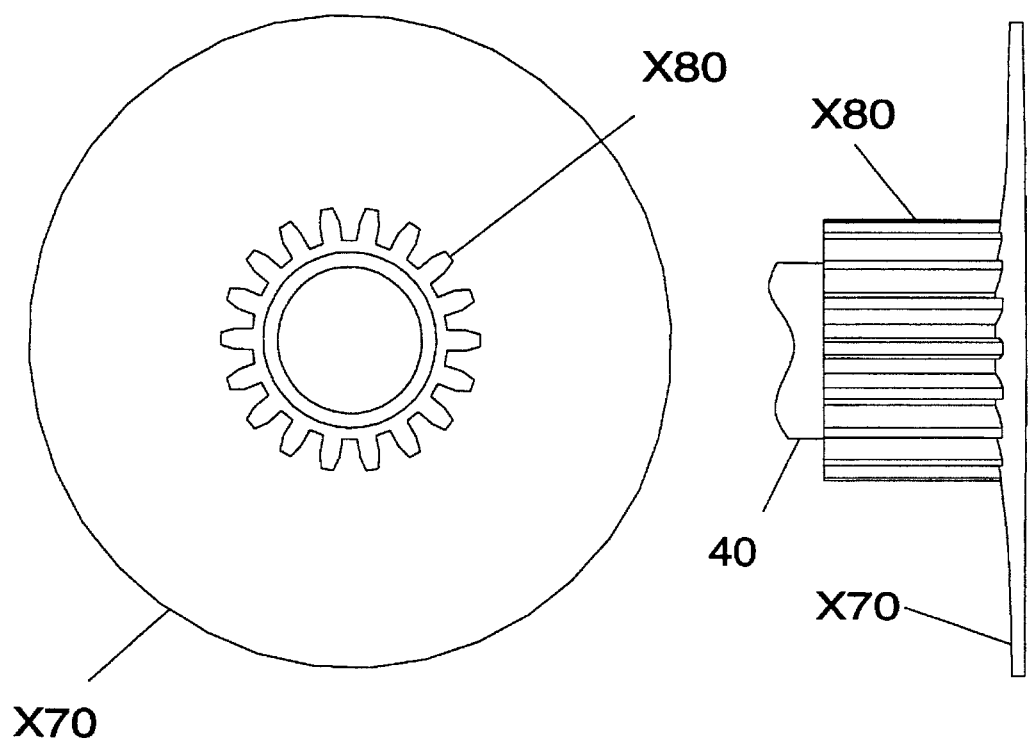
FIGS. 6 a) & b) present orthogonal views of a disk and pinion in accordance with the present invention.

In one embodiment, the present invention provides a mechanical transmission between a cam shaft driven by a prime mover and an output shaft. This transmission includes N (where N is an integer greater than one) identical cams X27 affixed to the cam shaft with a relative rotation from each other of 360° divided by N, each of said cams with a special surface X28 having two identical halves X29 and X29', as shown in FIG. 2, and an associated following means responsive to said special surface for producing one of N first oscillatory linear motions, said special surface is such that said first linear motions are directly proportional to the rotation angle of said cam over a significant portion of a cycle of rotation of the cam shaft, said portion to be called the linear portion. The transmission further includes variable scaling means, such as ILDM X00 and OLDM X40 working in concert, associated with each of said first oscillatory linear motions for producing second oscillatory linear motions that are a multiple of the size of said first oscillatory linear motions, whereby N of said second oscillatory linear motions are produced. The transmission also includes converting means, such as rack X46 and pinion X80 as shown in FIG. 2, associated with each of said second oscillatory linear motions for transforming said second oscillatory linear motions into oscillatory rotational motions of an object, such as disks X70, whereby N of said objects are produced. In addition, the transmission includes gripping means, including a bi-directional clutch such as calipers 52 and 56, for locking each said object to the output shaft only while said shaft is rotated in the same desired direction as the output shaft and while the associated said cam is in its linear portion, whereby N such gripping means are produced and wherein said gripping means includes calipers.

The preferred embodiment of the present invention includes four specialized linkages that are identical except for the relative phases of their associated cams and the direction that their associated disks face (the disks always face a flange). Like parts on each of the four linkages are identified with a three digit number starting with either a 1, 2, 3, or 4 to indicate a part of the first, second, third, or fourth linkage respectively. In view of the essential identity of the four linkages and to avoid redundancy, a detailed description of only the first linkage is provided.

Figure 1:
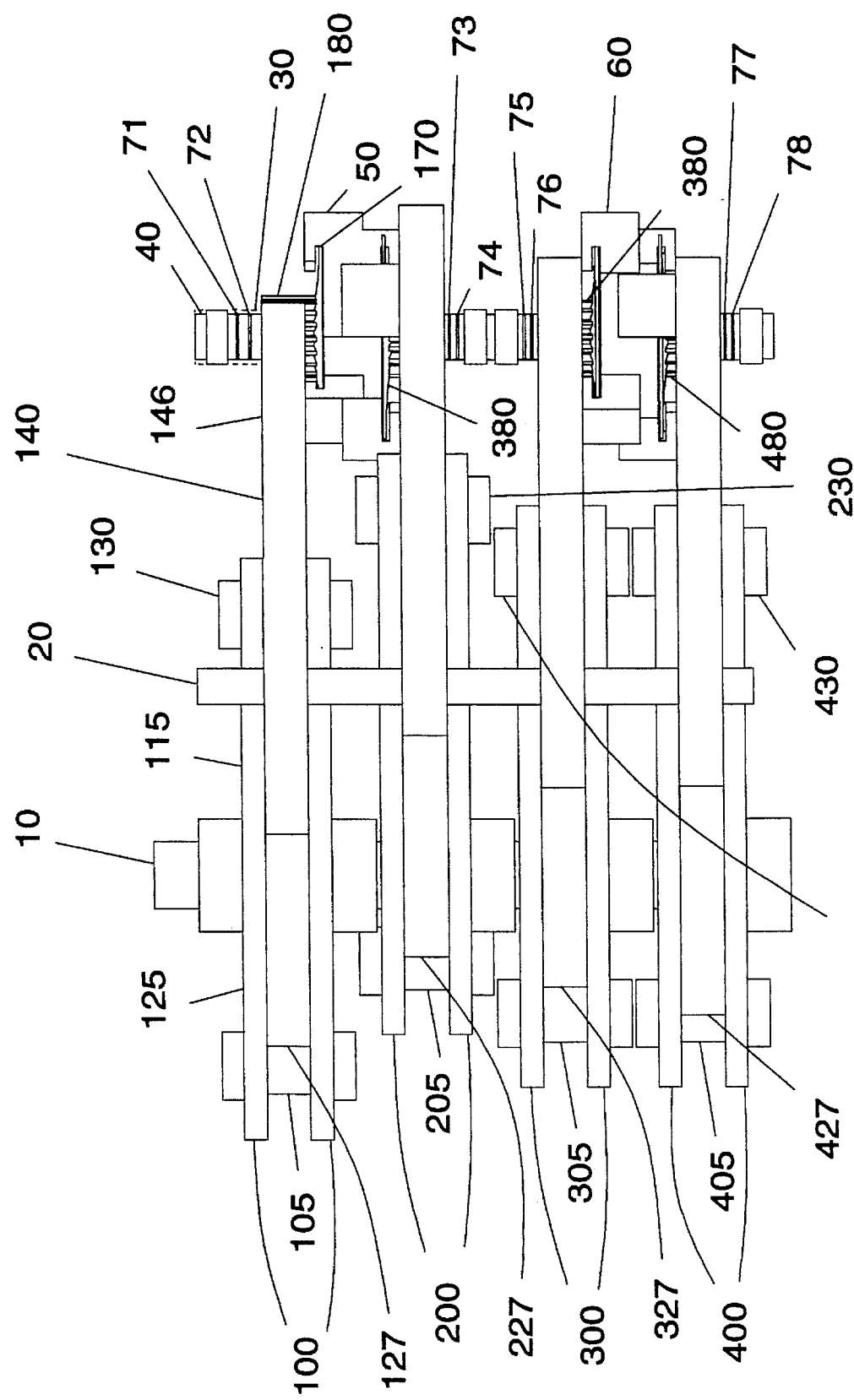
FIG. 1 is a top view of the preferred embodiment of the assembled transmission

The parts of the first linkage, and their interconnections, are shown on FIG. 2. The same figure may serve to illustrate the other linkages. FIG. 1 will help in visualizing how the four linkages work together. FIGS. 3, 4, 5, 6, 7, and 8 show details of the major parts. The angle between the extension of the major axis of first extended longitudinal orifice 125 and the major axis of first OLDM's guide slot 142 is denoted as φ. φ is zero when the two axes are parallel as shown in FIG. 2. The parts may be constructed of any material strong enough to withstand the forces encountered.

The first ILDM 100 rides on cam shaft 10 with the rotation of first cam 127 between first pull cam follower 105 and first push cam follower 115 causing first ILDM 100 to move back and forth along first extended longitudinal orifice 125. The end of first ILDM 100 distant from first pull cam follower 105 contains first power coupler 130.

Figure 9:
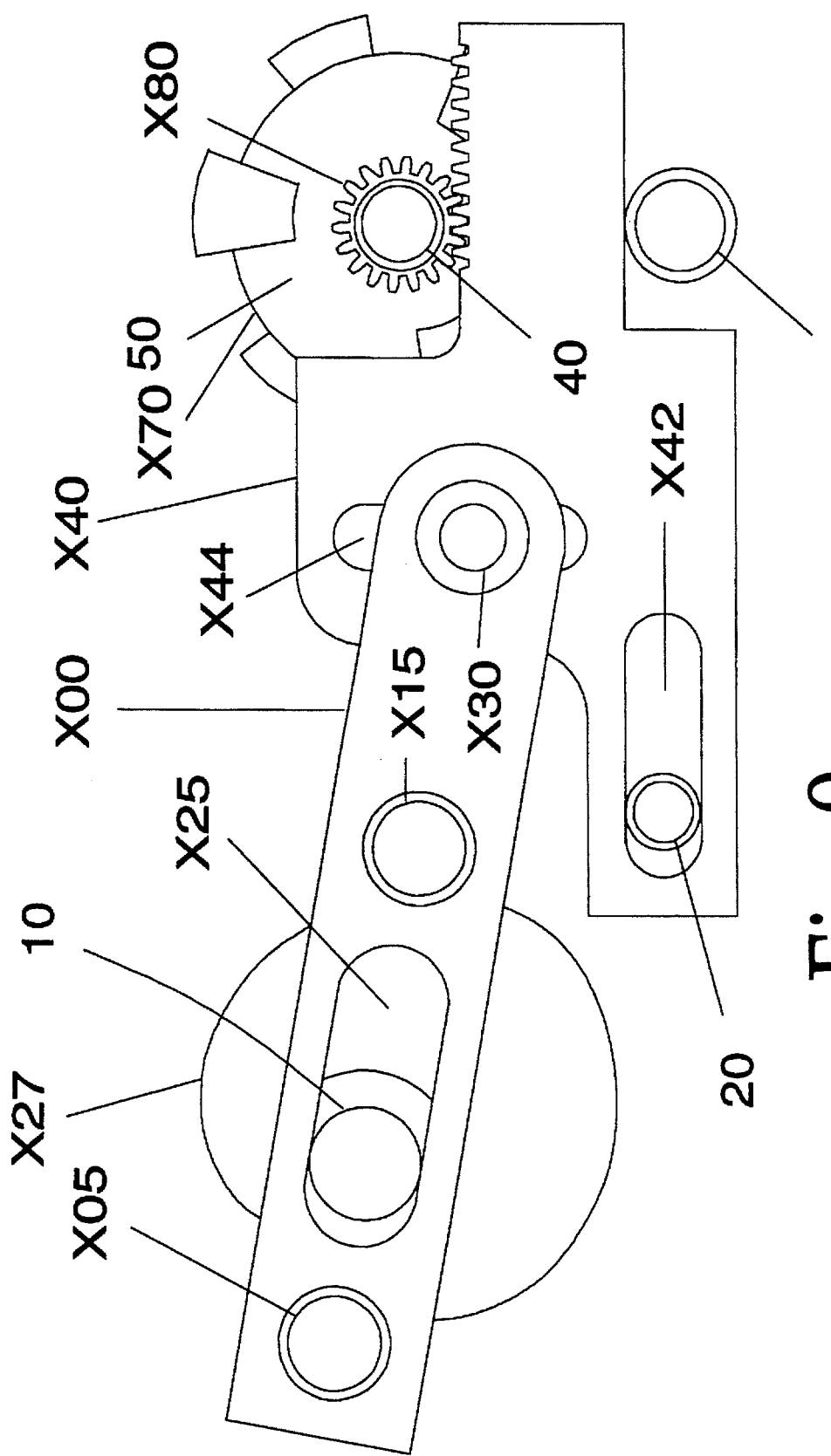
FIG. 9 is a side view of a specialized linkage with $\phi=10°$
Figure 10:
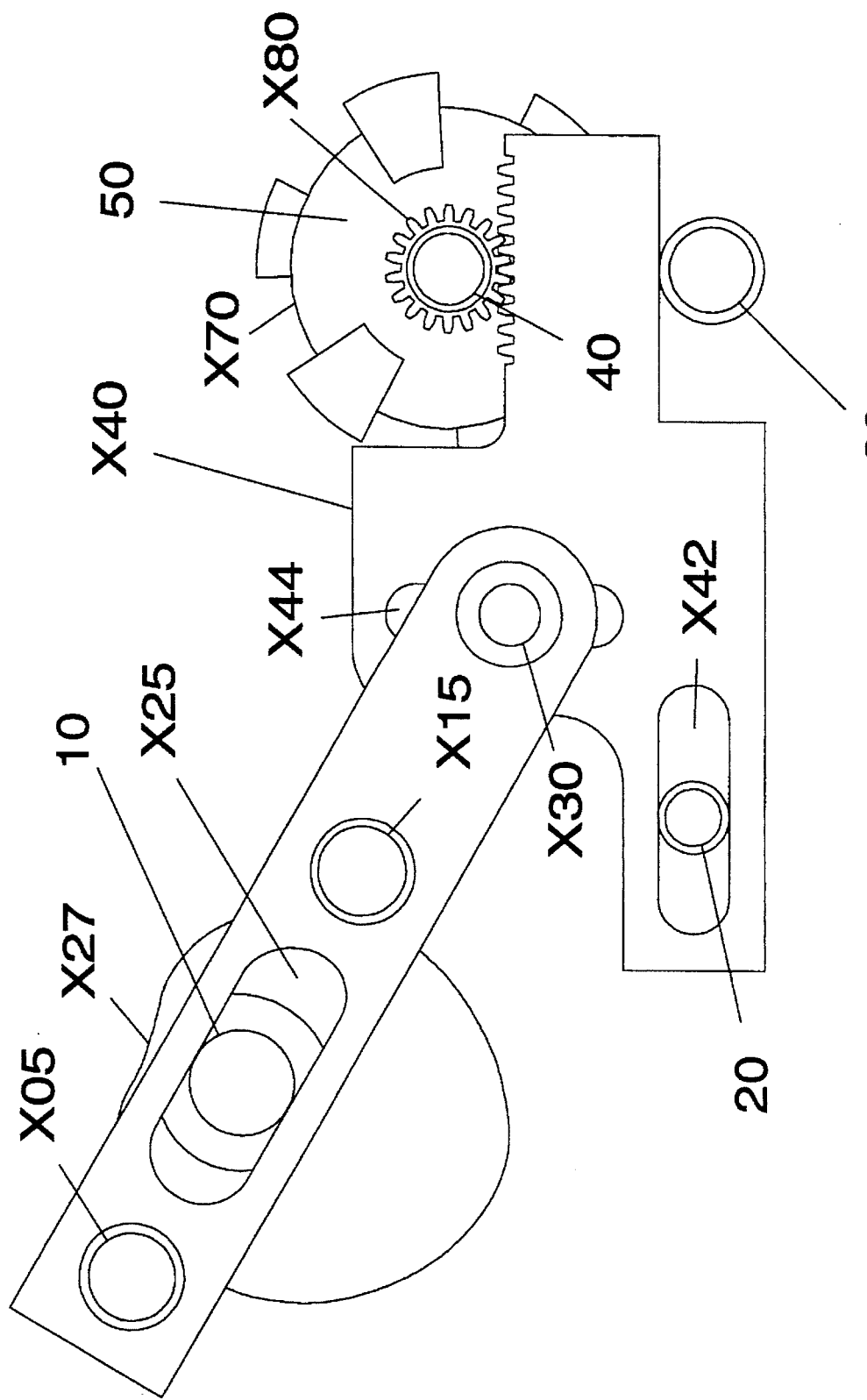
FIG. 10 is a side view of a specialized linkage with $\phi=30°$
Figure 11:
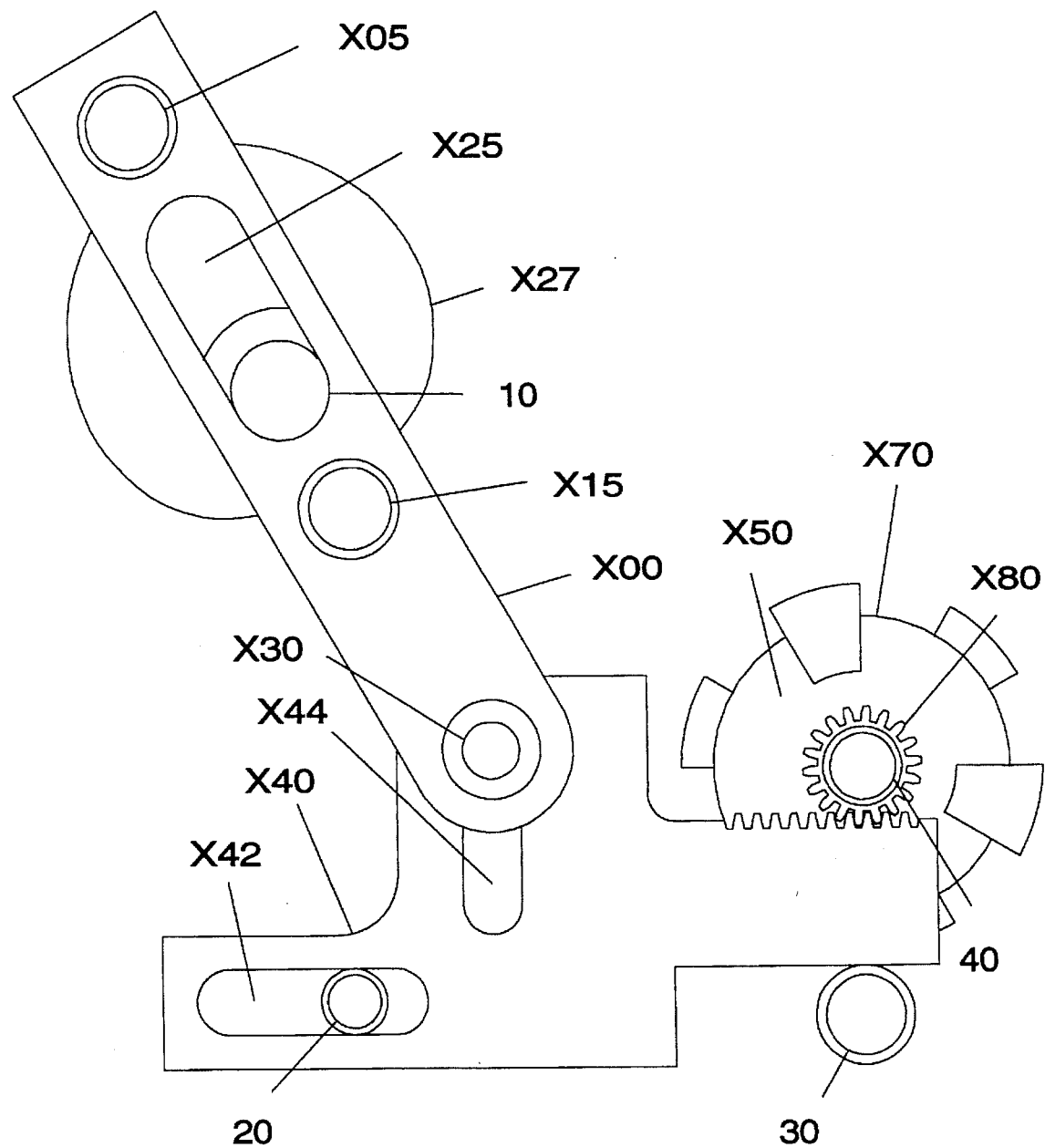
FIG. 11 is a side view of a specialized linkage with $\phi=60°$
Figure 12:
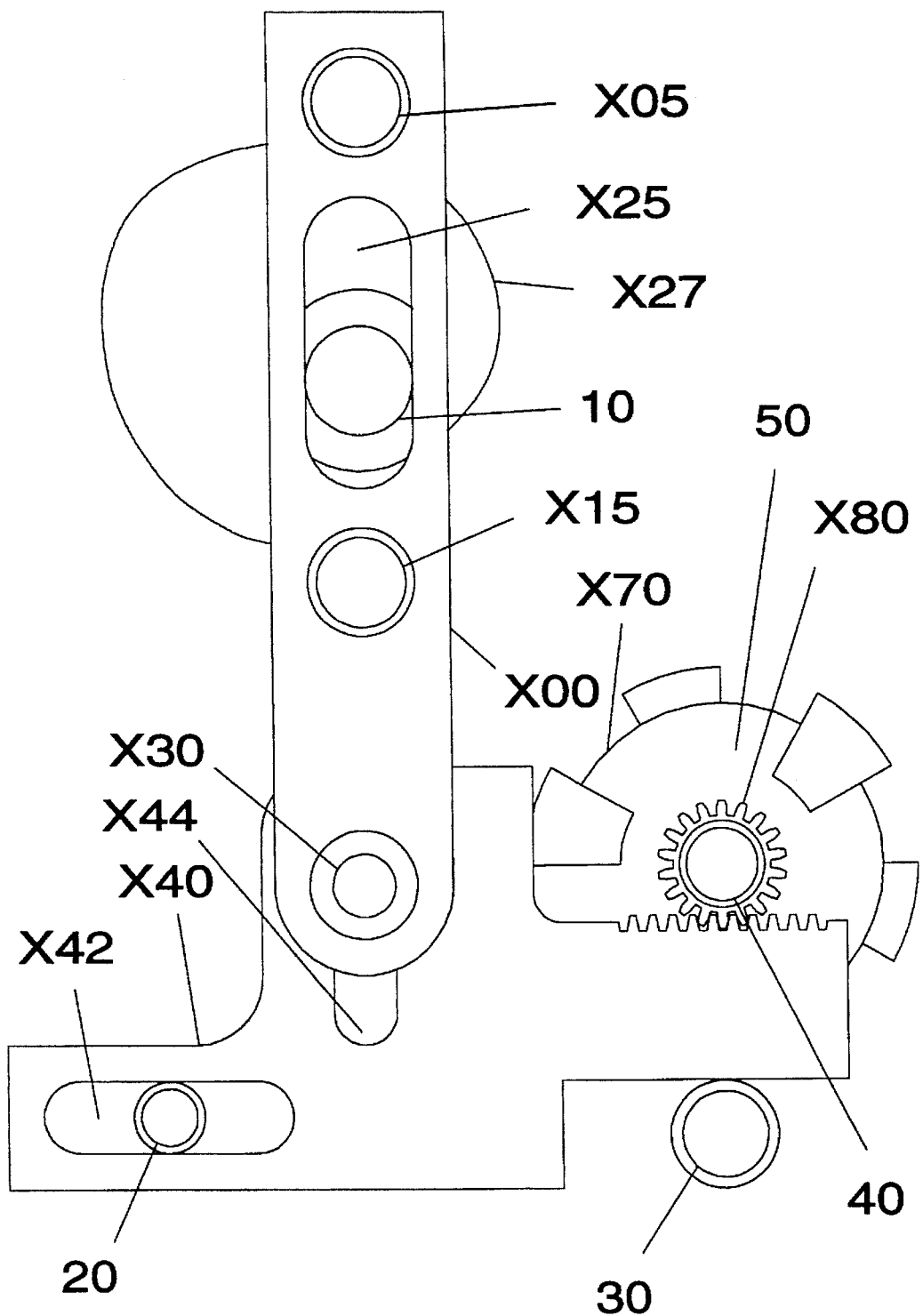
FIG. 12 is a side view of a specialized linkage with $\phi=90°$
Figure 13:
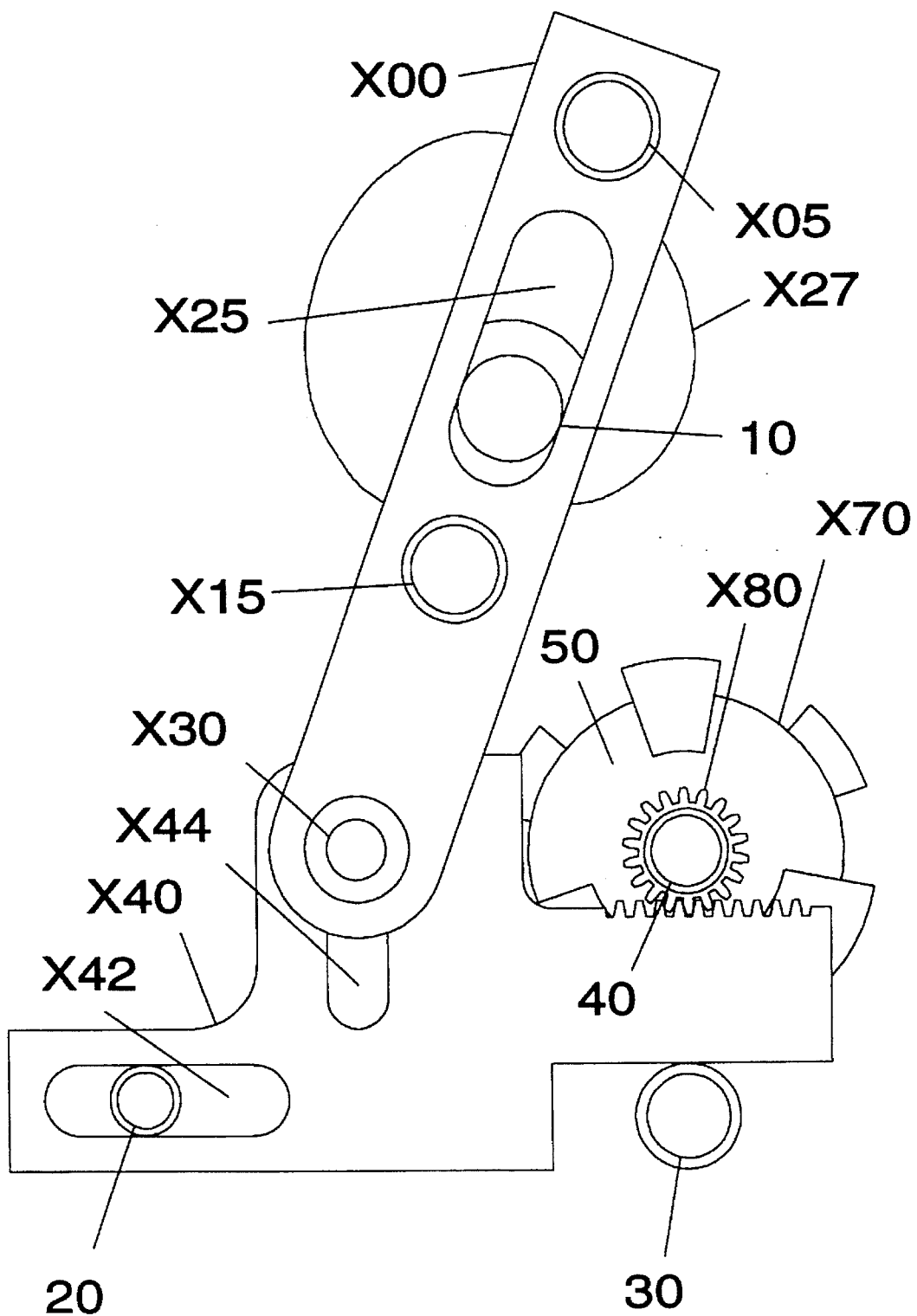
FIG. 13 is a side view of a specialized linkage with $\phi=110°$
Figure 14:
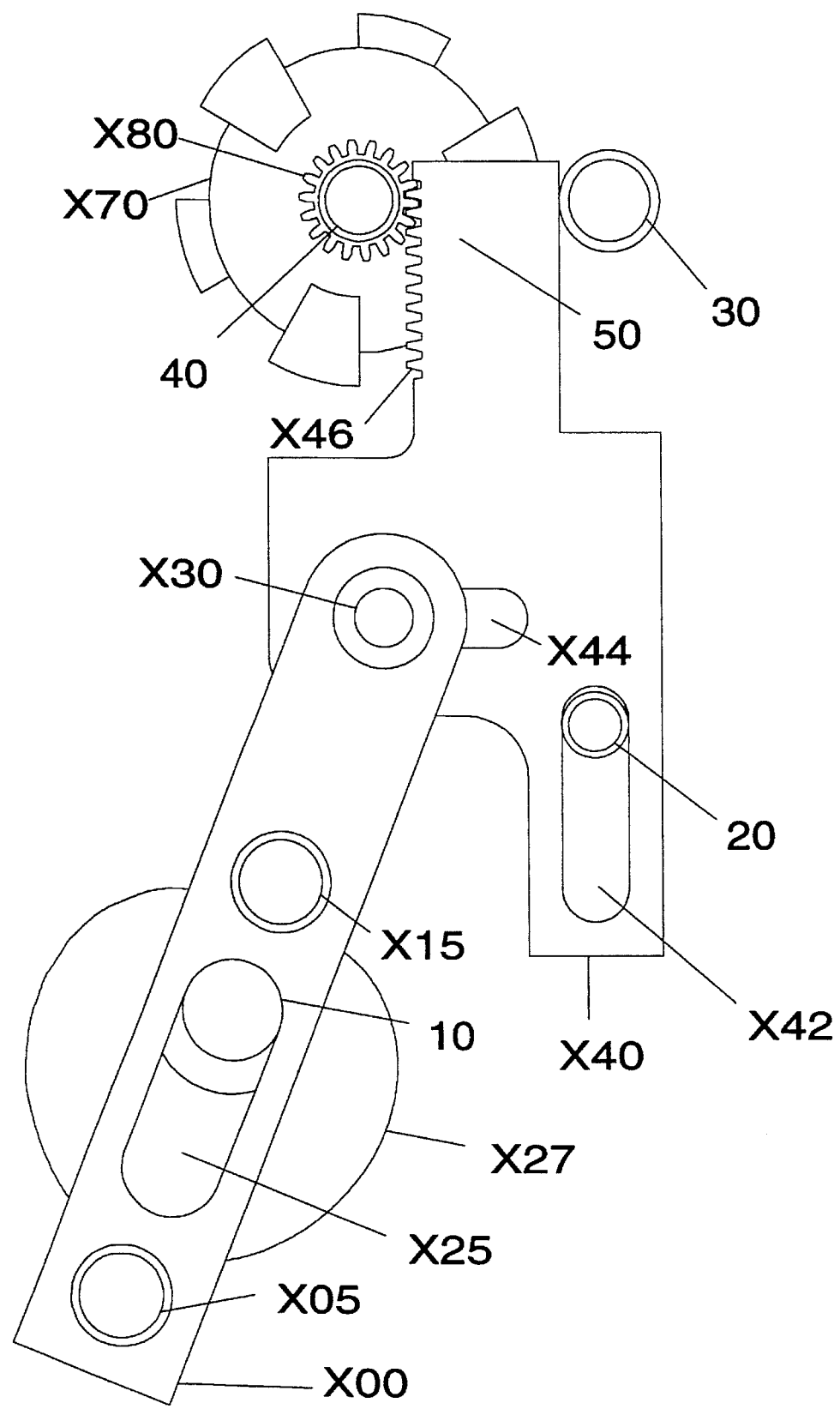
FIG. 14 to FIG. 23 (a total of ten figures) are side views of a specialized linkage with $\phi$ fixed at about 23° and with the rotation angle of the cam incremented by 36° (through a whole cycle of the cam shaft's rotation) on successive figures
Figure 15:
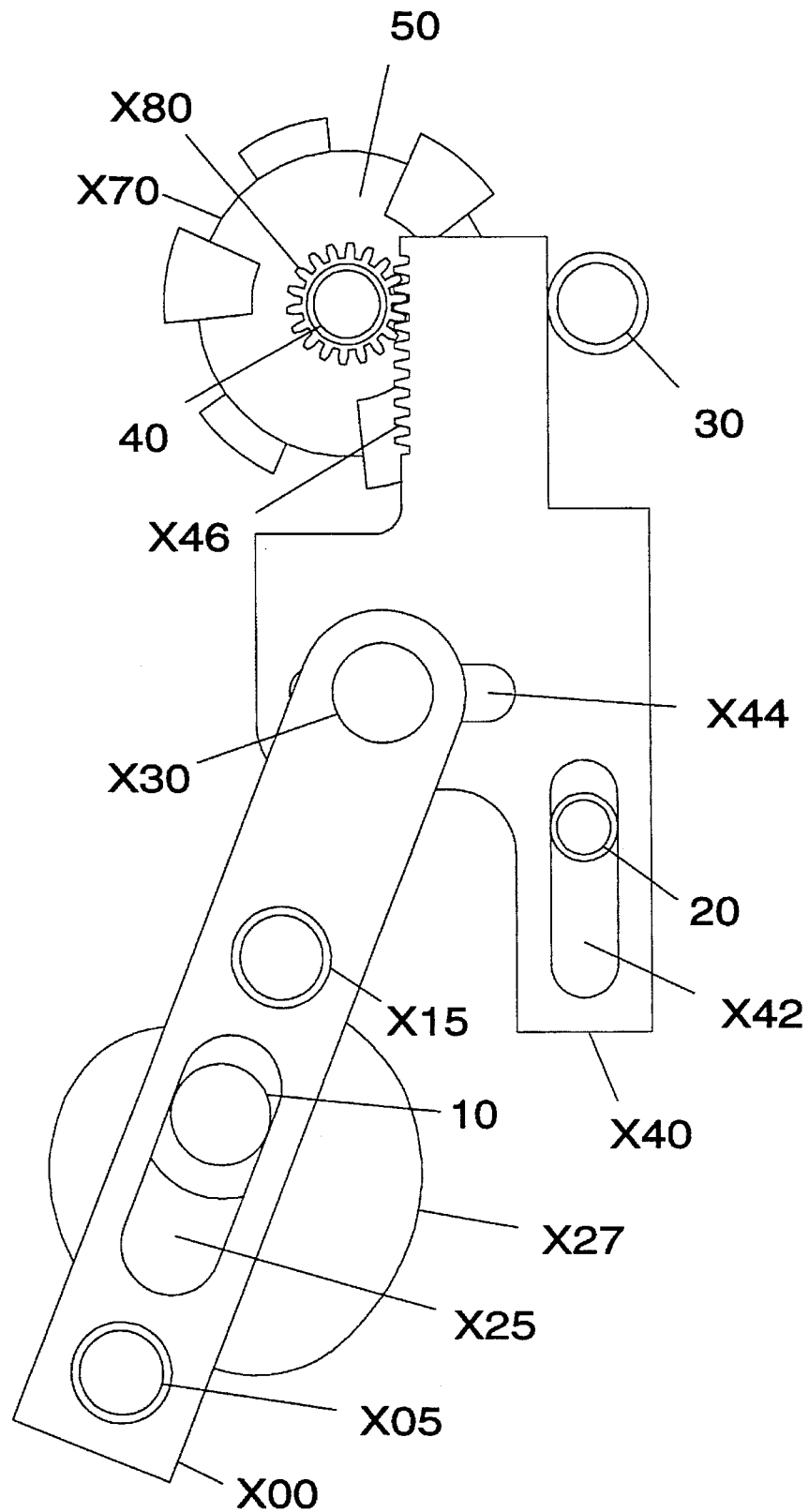
Figure 16:
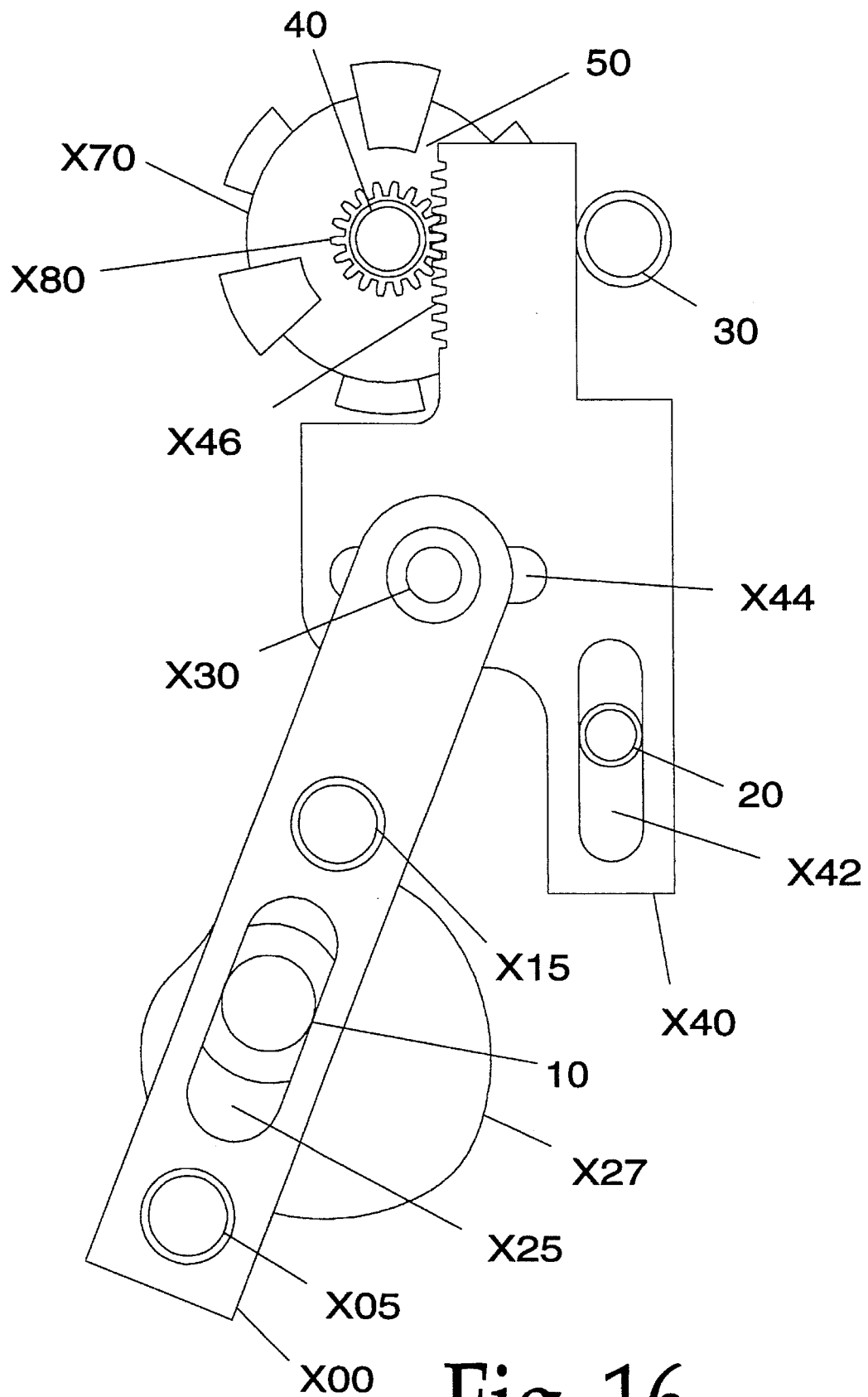
Figure 17:
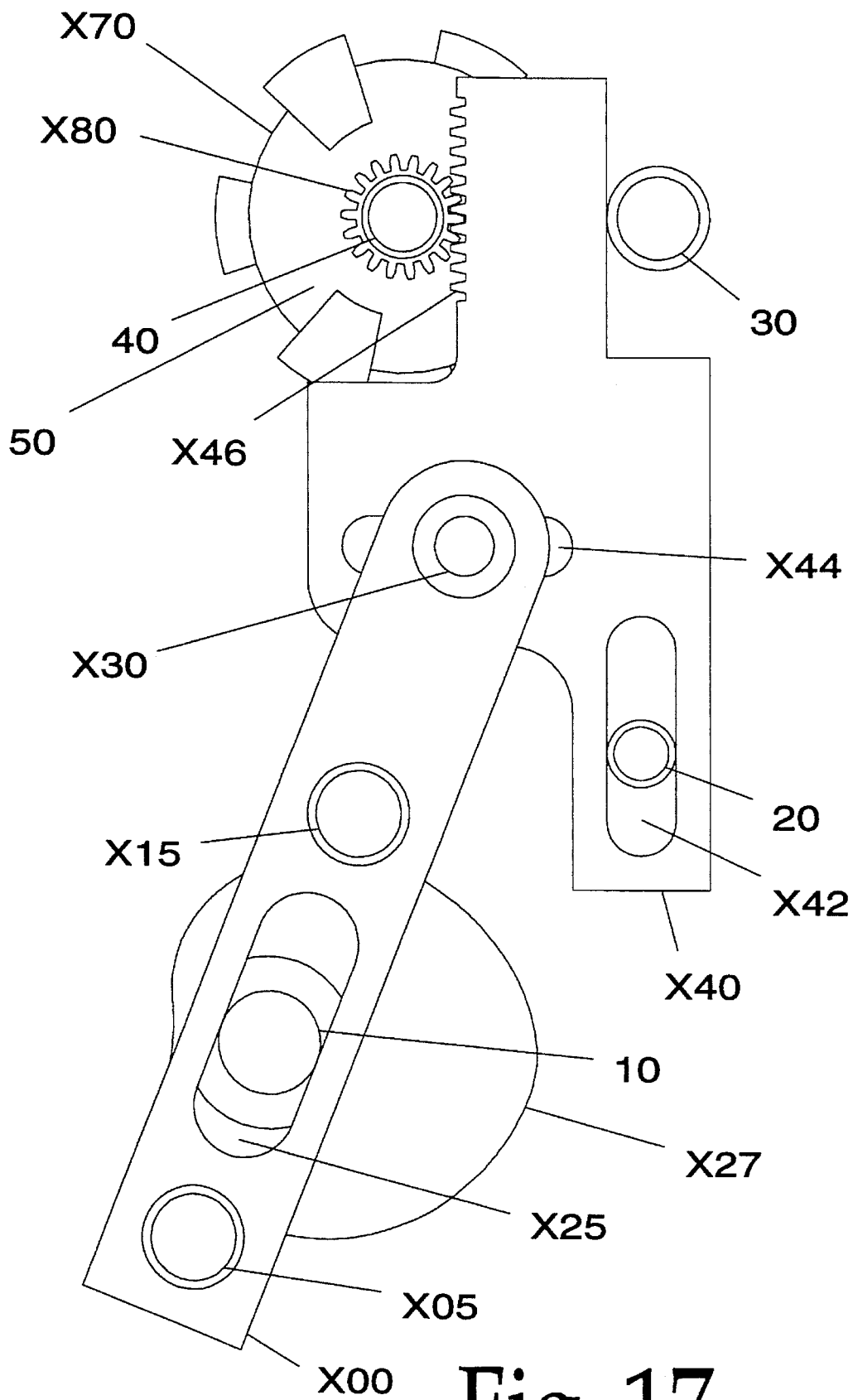
Figure 18:
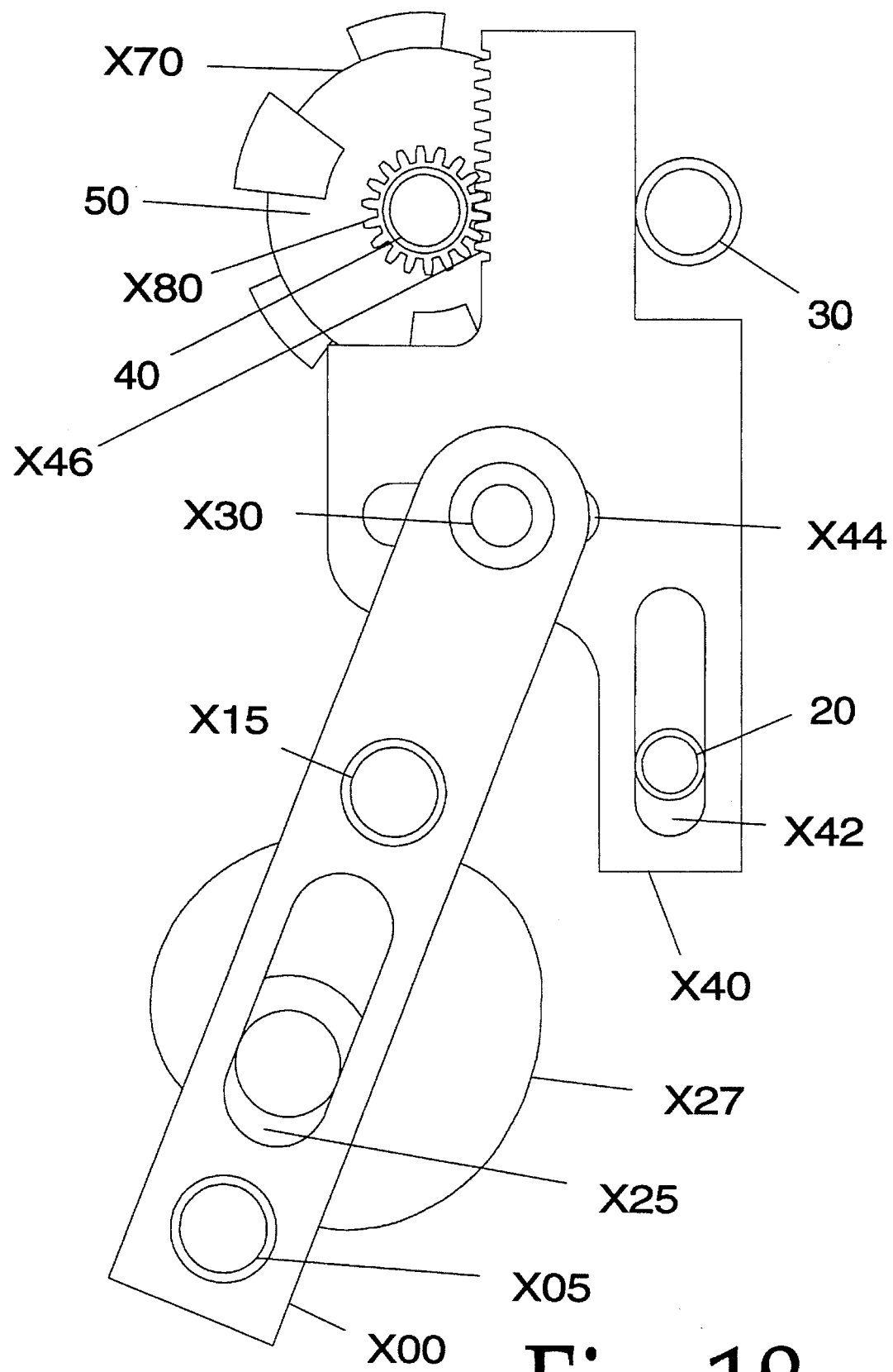
Figure 19:
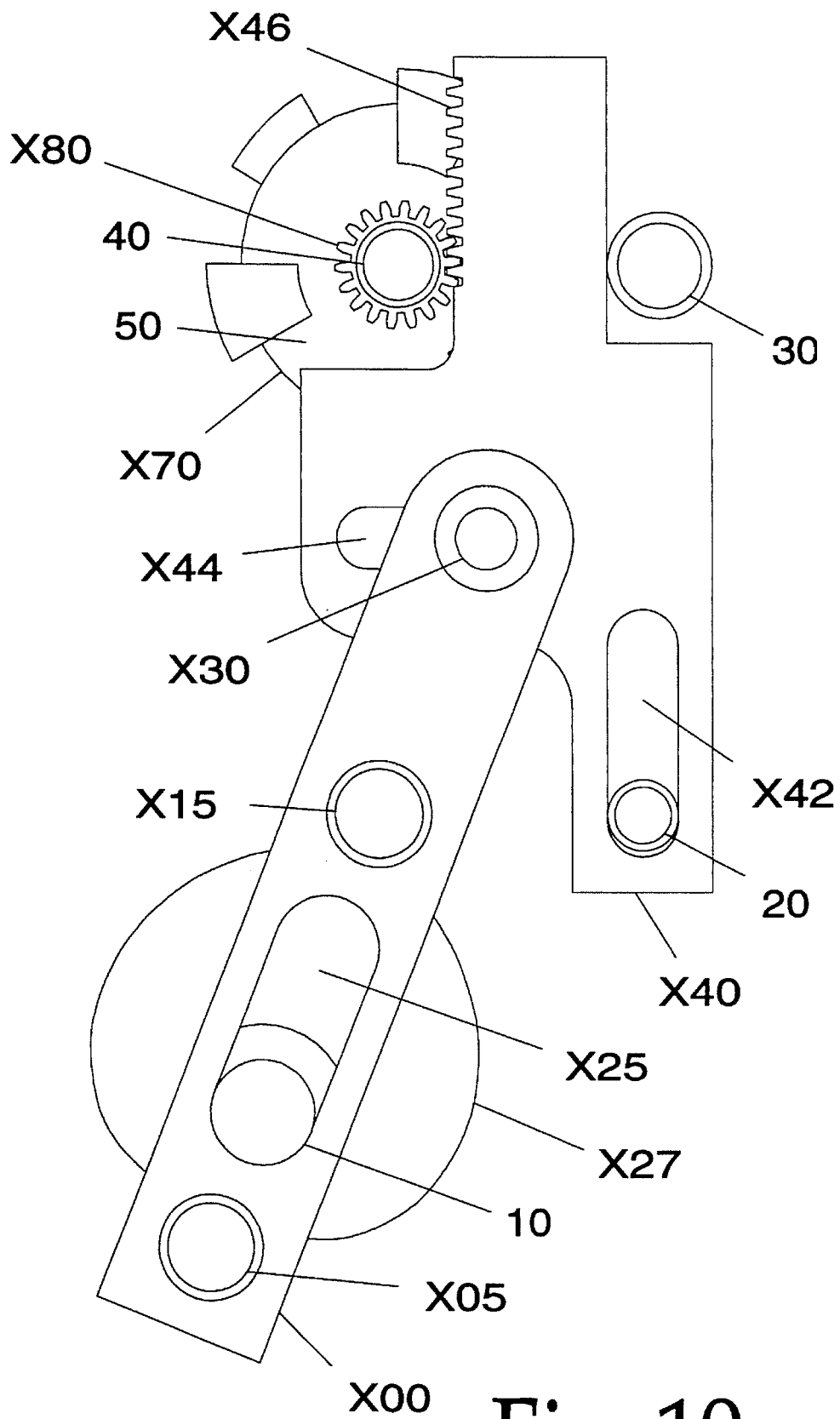
Figure 20:
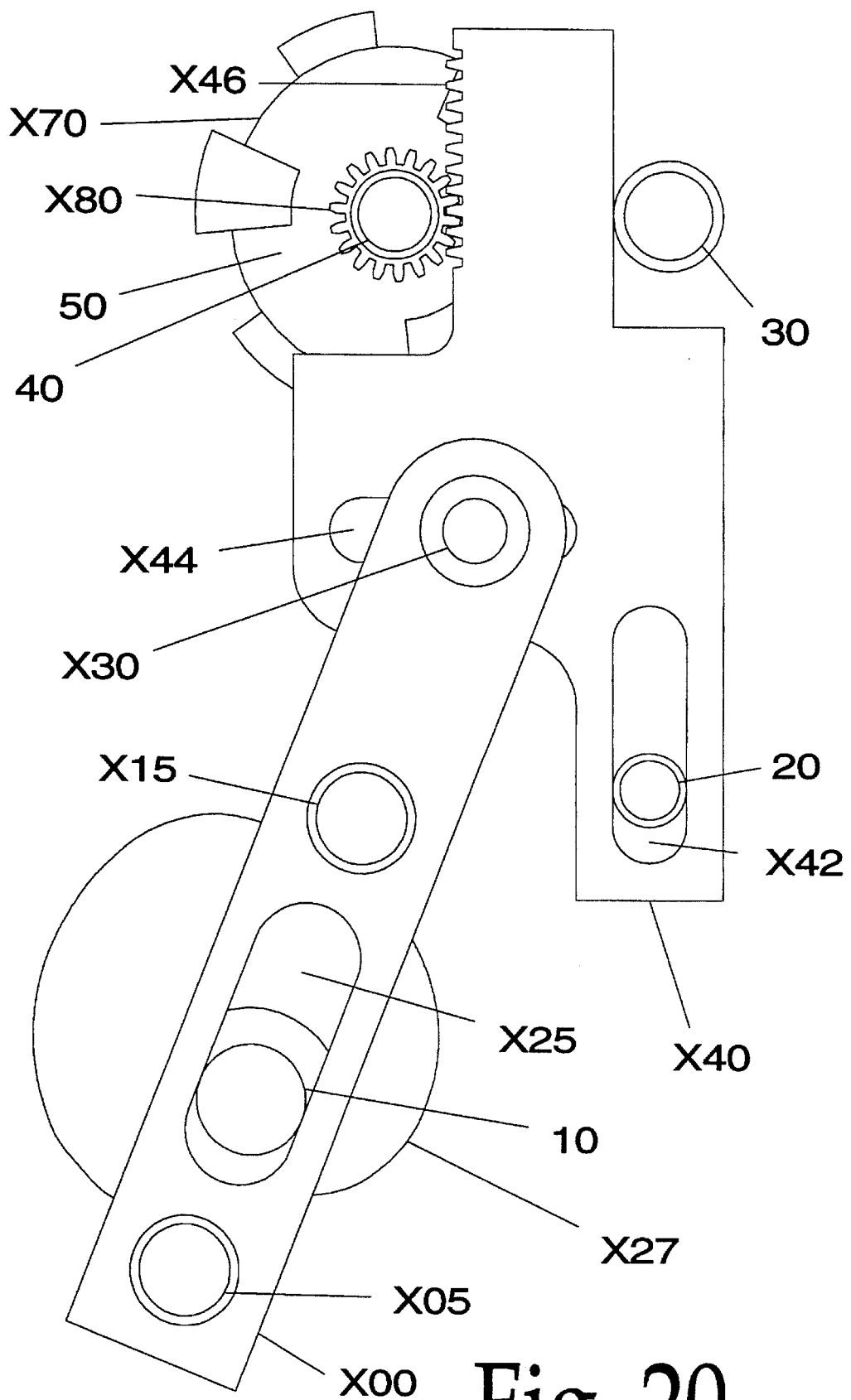
Figure 21:
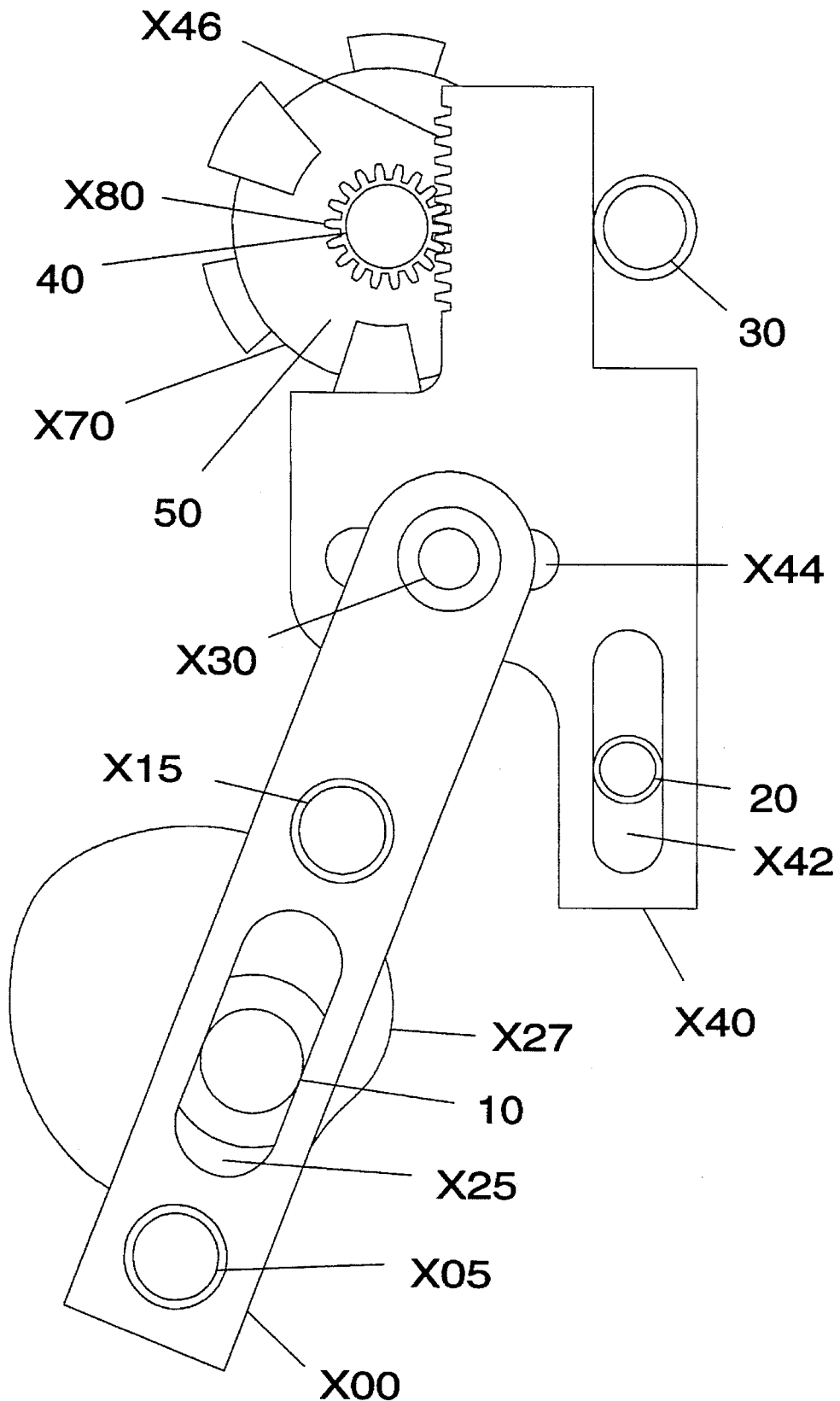
Figure 22:
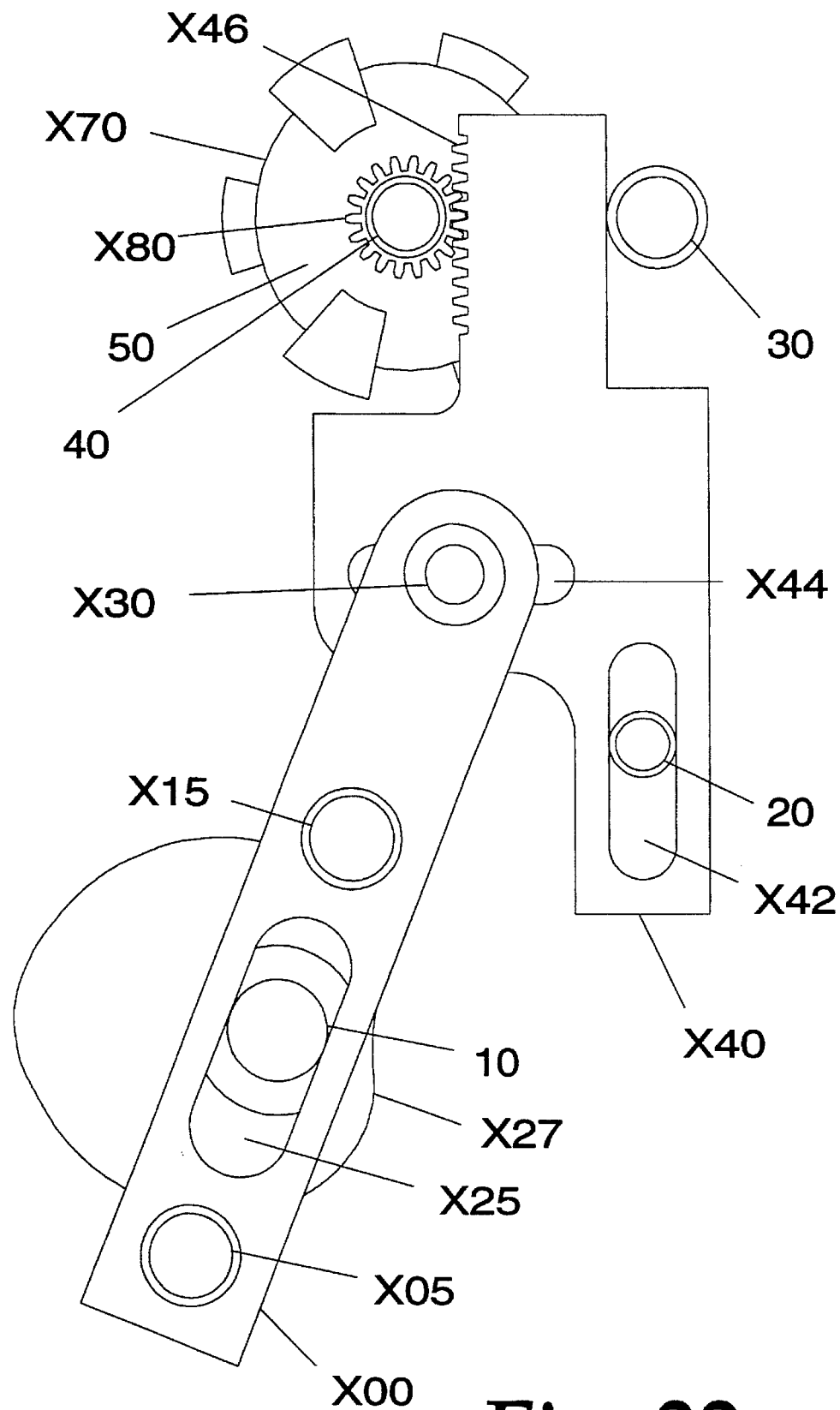
Figure 23:
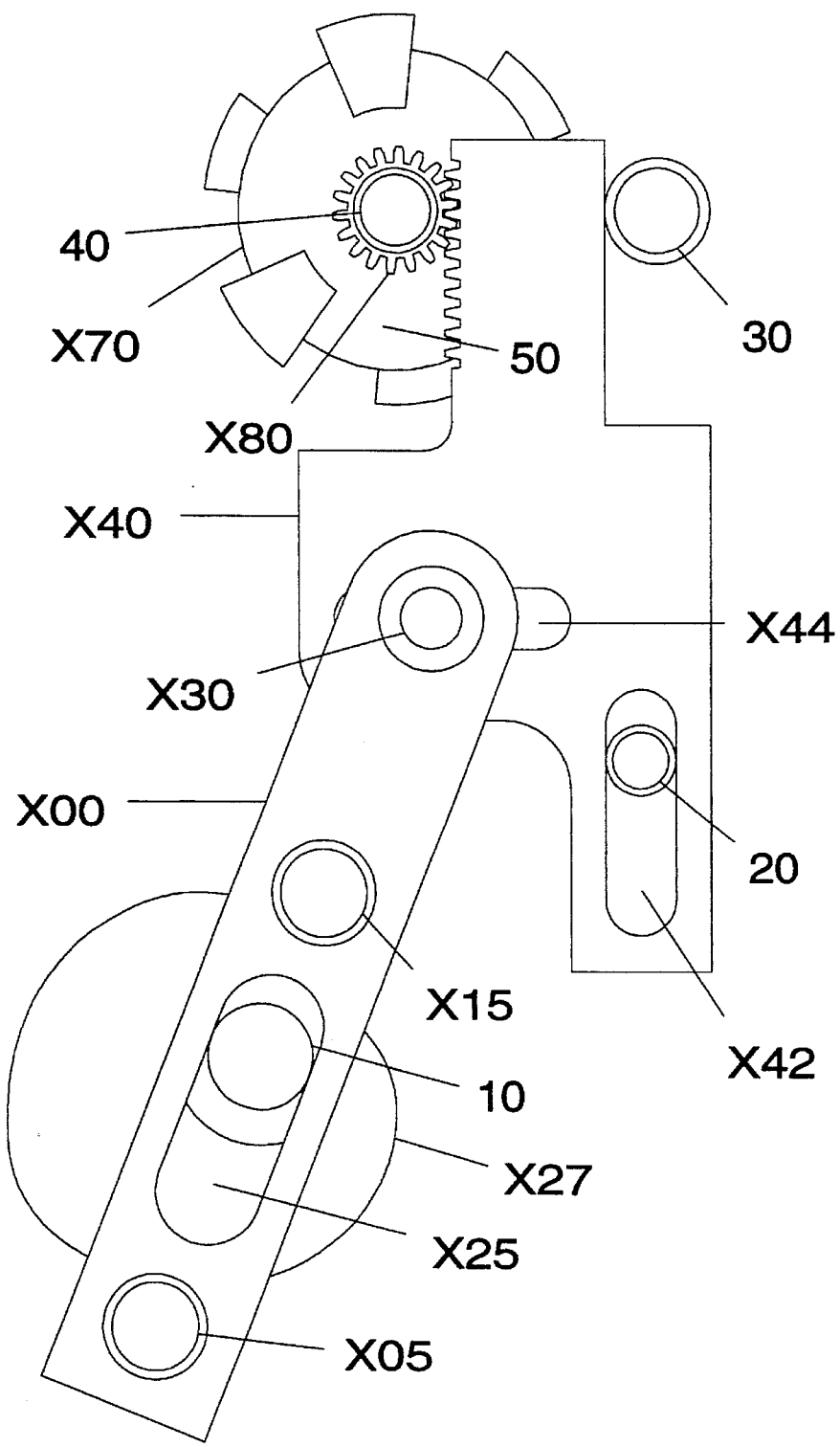

The first OLDM 140 communicates with first ILDM 100 through first power coupler 130 held slidably captive in first OLDM's axial orifice 144 such that (depending on the cosine of φ) the reciprocal motion of first ILDM 100 is transferred to first OLDM 140. Thus when φ is zero one unit of travel of first ILDM 100 will cause one unit of travel of first OLDM 140. This is shown on FIG. 2. If φ is about 60 degrees then only about 50% of first ILDM 100 motion will be transferred to first OLDM 140. This is shown on FIG. 11. If φ is 90 degrees then none of first ILDM 100 motion will be transferred to first OLDM 140 with first power coupler 130 merely traveling back and forth in first OLDM's axial orifice 144. This is shown on FIG. 12. If the angle is greater than 90 degrees then the first OLDM 140 will travel backwards when first ILDM 100 is traveling forwards. This is shown on FIG. 13. FIGS. 9 and 10 show intermediate values of φ.

The first OLDM 140 also contains first OLDM's guide slot 142 slidably surrounding output guide shaft 20 and first OLDM 140 rests upon output support shaft 30. The first OLDM 140 also contains first OLDM's rack 146 extending in a line parallel to the major axis of first OLDM's guide slot 142.

First disk 170 and its concentric first pinion 180 slidably surrounds output shaft 40 with first pinion 180 engaging first OLDM's rack 146. Output shaft 40, output support shaft 30, first OLDM's guide slot 142, output guide shaft 20, first pinion 180, and first OLDM's rack 146 are so arranged that as first OLDM 140 moves back and forth (normally because it is driven by the oscillations of first ILDM 100 coupled through first power coupler 130) the teeth of first OLDM's rack 146 remain meshed with first pinion 180. In particular, output guide shaft 20, output support shaft 30, and output shaft 40 always remain fixed with respect to each other.

Thus the rotation of cam shaft 10 and its attached first cam 127 will cause the oscillation of first ILDM 100, the oscillation of first OLDM 140 proportional to the cosine of φ, and finally the oscillation of first disk 170. Attention is drawn to FIG. 14 through FIG. 23 where for a fixed φ (and thus a fixed apparent gear ratio) the result of stepping the rotation of the cam in increments of 36° through an entire cycle is shown. First cam 127 is designed so that, for a constant rotation rate of cam shaft 10, first disk 170 will rotate at a constant rate (in one direction and then in the other direction) for a significant portion of each cycle of rotation of cam shaft 10.

Figure 25:
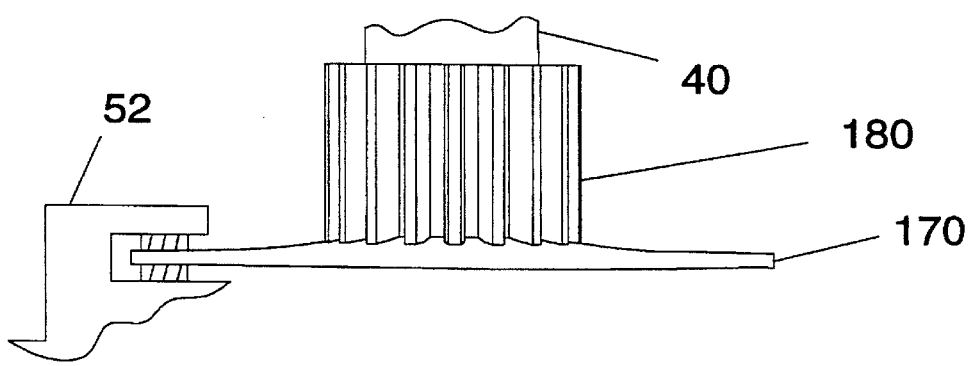
FIG. 25 is a side view of a disk and pinion with a caliper closed about the disk in accordance with the present invention.
Figure 7:
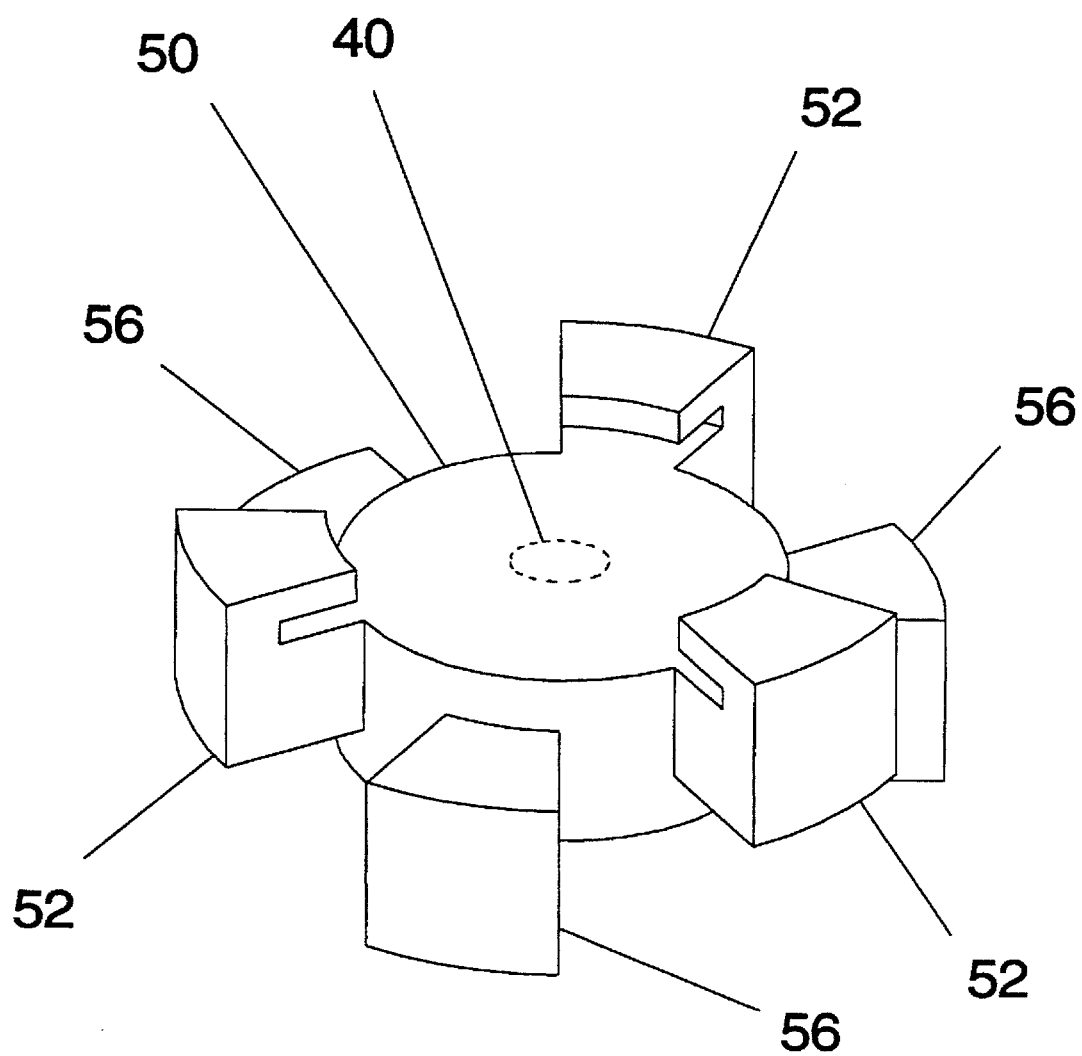
FIG. 7 is a perspective view of a flange and its calipers

First flange 50, and its calipers, effects a means for combining selective portions of the rotation of first disk 170 and second disk 270 to cause the unidirectional rotation of output shaft 40. First flange 50 is shown in detail on FIG. 7 and FIG. 8. It has three calipers 52 for engaging first disk 170 on one side, three calipers 56 for engaging second disk 270 on the other side and is fixed to output shaft 40 (rotating with output shaft 40). FIG. 25 is a side view of a disk and pinion with a caliper closed about the disk in accordance with the present invention. Output shaft 40, coupled to first disk 170, is locked by the closed position of calipers 52 about first disk 170. Electrical signals selectively to actuate the two sets of calipers is communicated through slip rings 71–78 (surrounding output shaft 40). First disk 170 rotates within the calipers 52 for engaging first disk 170 and second disk 270 rotates within calipers 56 for engaging second disk 270. In the preferred embodiment, first cam 127 and second cam 227 are identical but rotated 180° relative to each other on cam shaft 10. Over one rotation of cam shaft 10: calipers 52 for engaging first disk 170 engage during the period when first disk 170 is rotating at a constant rate and in the same direction as output shaft 40 and calipers 56 for engaging second disk 270 engage during the period when second disk 270 is rotating at a constant rate and in the same direction as output shaft 40. There is a short period of time twice per cycle when neither calipers 52 for engaging first disk 170 nor calipers 56 for engaging second disk 270 are engaged. The present invention could be implemented using only two cams, however the use of four cams is preferred because of the cancellations of vibrations that results.

Figure 24:
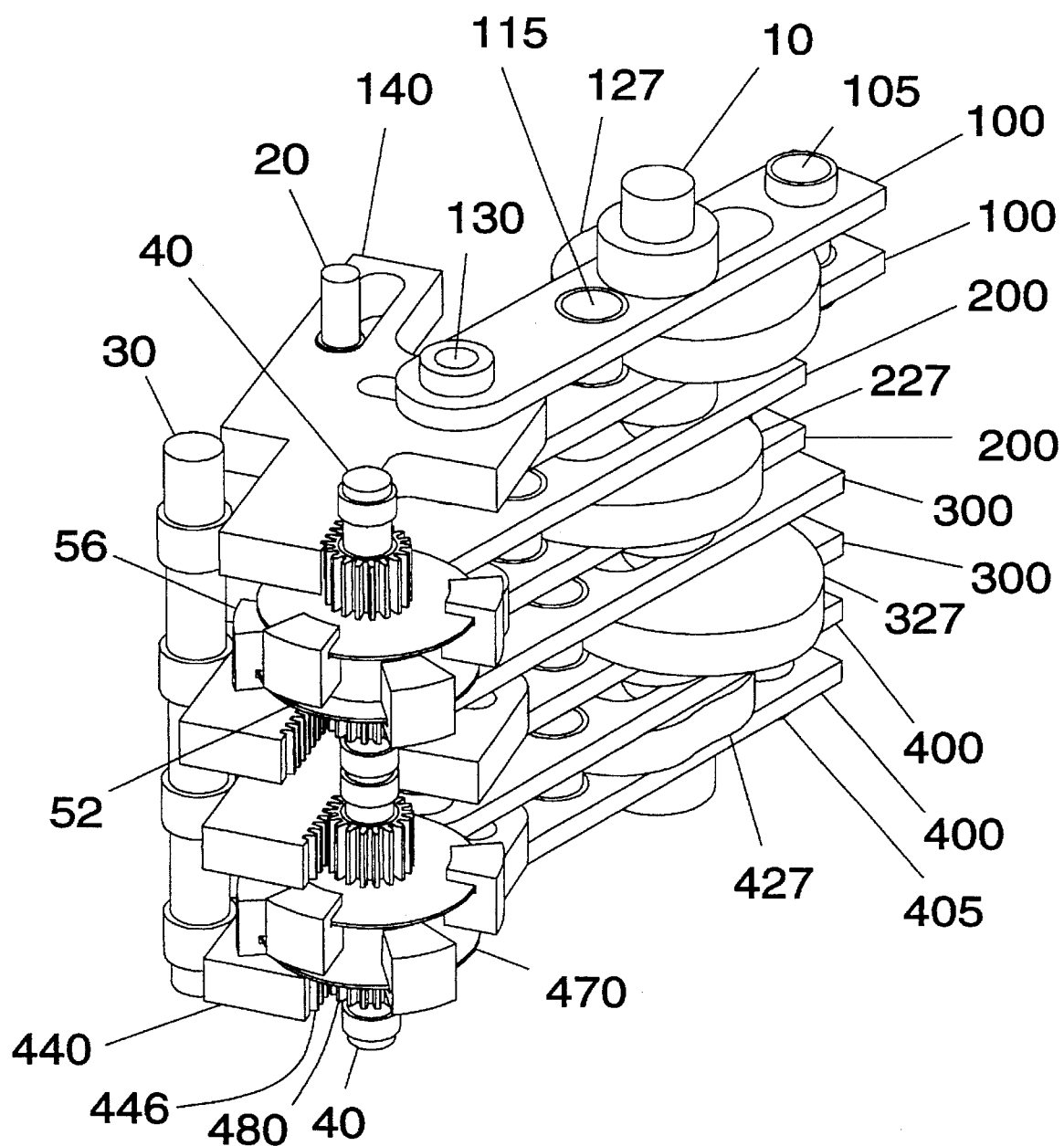
FIG. 24 is a perspective view of the whole transmission

Third cam 327 and fourth cam 427 are rotated 180° relative to each other on cam shaft 10 and, as a set, are rotated 90° with respect to first cam 127 and second cam 227, as a set. The set of parts driven by third cam 327 and fourth cam 427 is identical to the set of parts (just described) that is driven by first cam 127 and second cam 227. The motions of the two sets are necessarily 90 ° apart. Thus the engagement of the calipers on second flange 60 occurs 90° from the engagement of the calipers on first flange 50. Thus during the aforementioned two short periods per cycle when neither calipers 52 for engaging first disk 170 nor calipers 56 for engaging second disk 270 are engaged, it necessarily follows that one of the sets of calipers on second flange 60 will be engaged. So when all of the parts of the preferred embodiment of the present invention are assembled (as shown on FIG. 24) it follows that during one cycle of cam shaft 10 that the assertion or engagement of the four sets of calipers (denoted as 1, 2, 3, and 4) follows the following sequence (assume that for each cam the two linear portions extend for 140° and the two non-linear portions extend for 40°, and that the cycle starts at the beginning of a linear portion): 1 & 4 from 0° to 50°; 1 alone from 50° to 90°; 1 & 3 from 90° to 140°; 3 alone from 140° to 180°; 2 & 3 from 180° to 230°; 2 alone from 230° to 270°; 2 & 4 from 270° to 320°; and 4 alone from 320° to 360°. Clearly, the information needed to assert the calipers comes from the phase of cam shaft 10 and may come from a shaft mounted conventional shaft encoder or even a set of switches (one for each cooperating set of calipers) actuated by an auxiliary, special cam mounted on cam shaft 10. Such conventional means are not shown.

It is also apparent that if cam shaft 10 (and the captive ILDMs) and output shaft 40 (and captive OLDMs) are kept parallel to each other and then rotated so as to change $\phi$ that the effective mechanical advantage (apparent gear ratio) of the transmission may be adjusted between a maximum forward amount (when $\phi=0°$), to neutral (when $\phi=90°$), to a maximum reverse amount (when $\phi$ is at its limit). Thus varying $\phi$ effects a mechanical transmission continuously variable from forward to reverse. Output guide shaft 20, output support shaft 30, and output shaft 40 always remain fixed with respect to each other; and may be rotated by conventional means with respect to cam shaft 10 so as to effect a change in apparent gear ratio. If $\phi$ is changed while two calipers are engaged there will be a tendency for slippage between an engaged caliper and a disk. It is desirable, therefore, to restrict shifting to those four periods per cycle of cam shaft 10 when only one caliper is engaged or to disengage one of the two calipers that would have been engaged during shifting. These two methods may be implemented with conventional electrical logic units.

The preferred embodiment has been described. Alternate embodiments of the present invention have been described both above and in the Summary Of The Invention. The embodiments described are illustrative and not restrictive.

We claim:

1. A mechanical transmission between a cam shaft driven by a prime mover and an output shaft comprising:

N (where N is an integer greater than one) identical cams affixed to the cam shaft with a relative rotation from each other of 360° divided by N, each of said cams with a special surface and an associated following means responsive to said special surface for producing one of N first oscillatory linear motions, said special surface is such that said first linear motions are directly proportional to the rotation angle of said cam over a significant portion of a cycle of rotation of the cam shaft, said portion to be called the linear portion;

variable scaling means associated with each of said first oscillatory linear motions for producing second oscillatory linear motions that are a multiple of the size of said first oscillatory linear motions, whereby N of said second oscillatory linear motions are produced;

converting means associated with each of said second oscillatory linear motions for transforming said second oscillatory linear motions into oscillatory rotational motions of an object, whereby N of said objects are produced; and gripping means for locking each said object to the output shaft only while said shaft is rotated in the same desired direction as the output shaft and while the associated said cam is in its linear portion, whereby N such gripping means are produced and wherein said gripping means includes calipers.

2. A transmission as recited in claim 1 wherein said following means comprises cam followers.

3. A transmission as recited in claim 1 wherein said N identical cams are comprised of two identical halves.

4. A transmission as recited in claim 1 wherein said variable scaling means uses two links pivotally connected such that the angle between them determines said multiple.

5. A transmission as recited in claim 1 wherein said multiple includes both positive and negative numbers.

6. A transmission as recited in claim 1 wherein said converting means includes a link with gear teeth extending longitudinally and engaging said object.

7. A transmission as recited in claim 6 wherein said object comprises a disk and concentric pinion that engages said teeth of said link.

8. A mechanical transmission between a cam shaft driven by a prime mover and an output shaft comprising:

N (where N is an integer greater than one) identical cams affixed to the cam shaft with a relative rotation from each other of 360° divided by N, each of said cams with a special surface and an associated following means responsive to said special surface for producing one of N first oscillatory linear motions, said special surface is such that said first linear motions are directly proportional to the rotation angle of said cam over a significant portion of a cycle of rotation of the cam shaft, said portion to be called the linear portion;

variable scaling means associated with each of said first oscillatory linear motions for producing second oscillatory linear motions that are a multiple of the size of said first oscillatory linear motions, whereby N of said second oscillatory linear motions are produced;

converting means associated with each of said second oscillatory linear motions for transforming said second oscillatory linear motions into oscillatory rotational motions of an object, whereby N of said objects are produced; and a bi-directional clutch for locking each said object to the output shaft only while said shaft is rotated in the same desired direction as the output shaft and while the associated said cam is in its linear portion.

9. A transmission as recited in claim 8 wherein said following means comprises cam followers.

10. A transmission as recited in claim 8 wherein said N identical cams are comprised of two identical halves.

11. A transmission as recited in claim 8 wherein said variable scaling means uses two links pivotally connected such that the angle between them determines said multiple.

12. A transmission as recited in claim 8 wherein said multiple includes both positive and negative numbers.

13. A transmission as recited in claim 8 wherein said converting means includes a link with gear teeth extending longitudinally and engaging said object.

14. A transmission as recited in claim 13 wherein said object comprises a disk and concentric pinion that engages said teeth of said link.

15. A transmission as recited in claim 8 wherein said bi-directional clutch includes calipers.

* * * * *